United States Patent
Onozu

(10) Patent No.: US 7,159,770 B2
(45) Date of Patent: Jan. 9, 2007

(54) SHOP SETTLEMENT METHOD, SYSTEM AND PROGRAM

(75) Inventor: Takayuki Onozu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 10/886,689

(22) Filed: Jul. 9, 2004

(65) Prior Publication Data
US 2005/0211771 A1 Sep. 29, 2005

(30) Foreign Application Priority Data
Mar. 26, 2004 (JP) .............................. 2004-091132

(51) Int. Cl.
*G06K 15/00* (2006.01)
(52) U.S. Cl. .................. 235/383; 235/492; 235/472.01
(58) Field of Classification Search ................ 235/383, 235/375, 380, 492, 472.01; 705/16
See application file for complete search history.

(56) References Cited

U.S. PATENT DOCUMENTS 6,250,557 B1 * 6/2001 Forslund et al. ............ 235/492
6,854,651 B1 * 2/2005 Smith et al. ............ 235/462.01
6,854,652 B1 * 2/2005 Omori .................... 235/462.01
2002/0042722 A1 * 4/2002 Tsuji et al. ..................... 705/1
2003/0233276 A1 * 12/2003 Pearlman et al. ............. 705/14

* cited by examiner

*Primary Examiner*—Ahshik Kim
(74) *Attorney, Agent, or Firm*—Staas & Halsey LLP

(57) ABSTRACT

In a shop POS register terminal, a settlement request-generating unit generates settlement request information, which includes an amount of settlement. A request barcode is generated from the settlement request information, and the POS register terminal displays or prints the information. In a cell phone, the camera restores the settlement request information through the request barcode image. The amount of settlement is subtracted from a value charged to an IC chip. Settlement response information is generated, which includes the balance after settlement of the IC chip. Then a response barcode is generated from the settlement response information, and causes the cell phone to display the same. In the POS register terminal, the response barcode is read out to restore the settlement response information. Then an IC card settlement-ending unit confirms and causes the POS register terminal to print the receipt.

16 Claims, 28 Drawing Sheets

FIG. 8

| 88 | 90 | 92 | 94 | 96 | 98 | 100 |
|---|---|---|---|---|---|---|
| CELL PHONE IDENTIFIER | BALANCE AFTER TRANSACTION | DATE AND TIME | IC CARD TRANSACTION SERIAL NO. | POS IDENTIFIER | POS TRANSACTION SERIAL NO. | TRANSACTION CERTIFICATE |

86

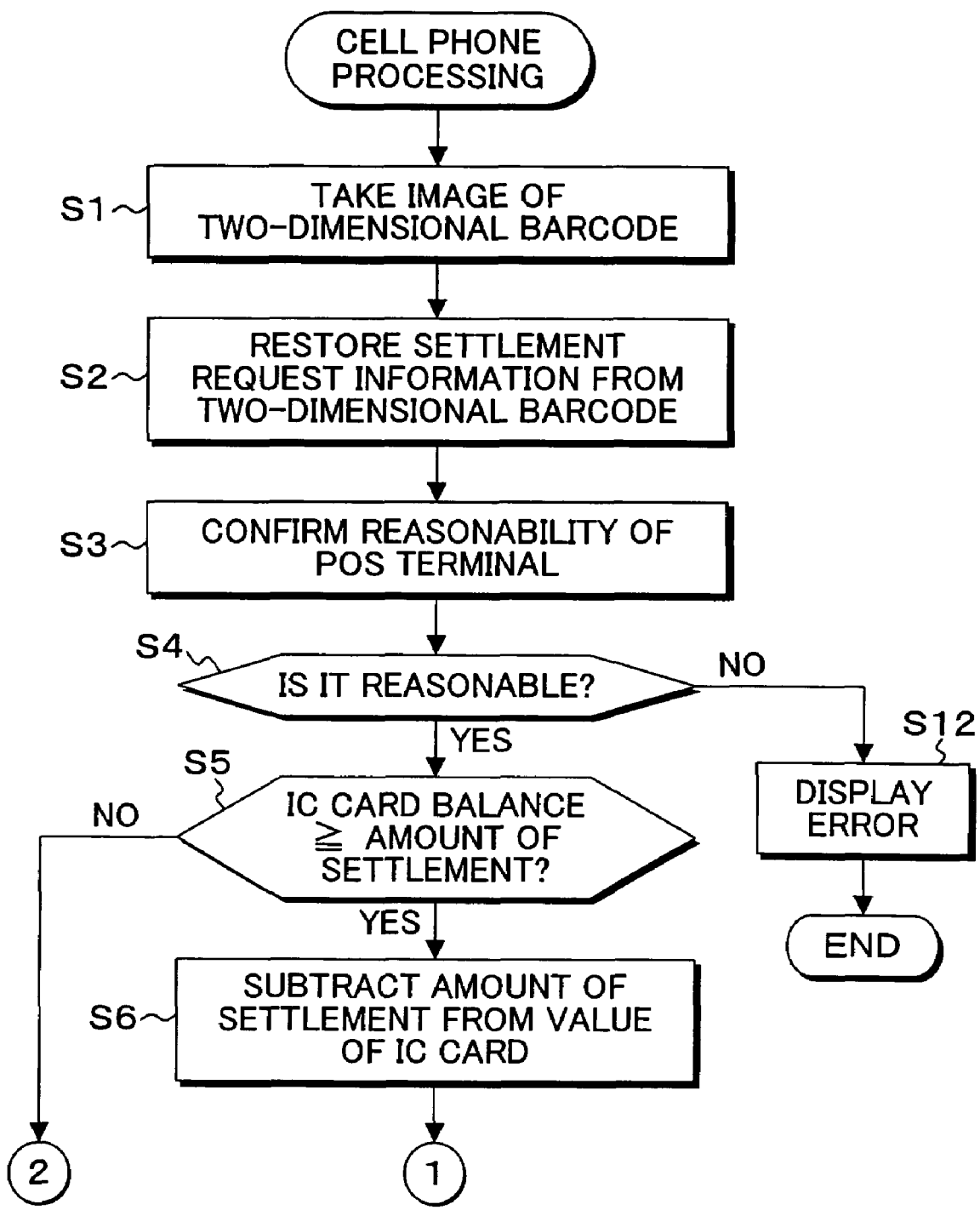

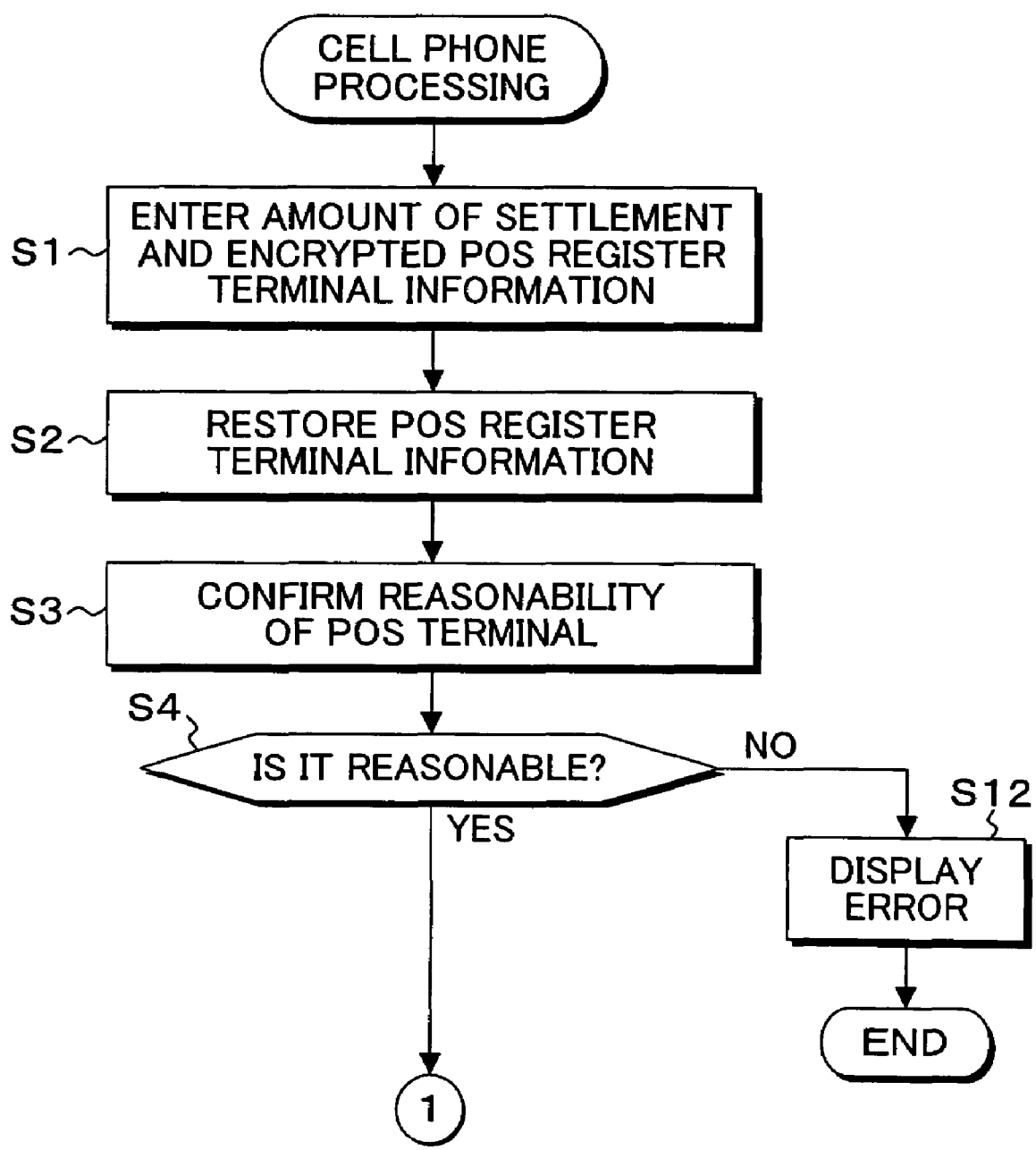

SHOP SETTLEMENT METHOD, SYSTEM AND PROGRAM

BACKGROUND OF THE INVENTION

1. Field of the Invention

The present invention relates to a shop settlement method for performing a settlement at a POS register terminal by use of a cell phone having a camera unit with a built-in IC chip, a system and a program therefore. More particularly, the invention relates to a shop settlement method for conducting exchange of settlement information between a POS register terminal and a cell phone via display and reading of barcode images, a system and a program therefore.

2. Description of the Related Art

Wide popularization of cashless systems based on IC chips has just been started, and in the area of POS systems, settlement systems using IC cards are practically in use. Such an IC card settlement system is achieved by connecting a settlement terminal exclusively for IC card to a conventional POS register terminal. The settlement terminal used in such an IC card settlement system may be of the contact type or of the non-contact type. The result of transaction of IC card settlement is notified to the IC card settlement center from the shop POS register terminal or a special settlement terminal.

A cell phone having a built-in IC chip has recently been industrialized as a portable terminal usable for a cashless system. In the case of prepaid type settlement, by charging the necessary amount in advance in an IC chip of a cell phone via a bank terminal or internet, this is applicable for settlement when purchasing goods in a shop as in conventional settlement with an IC chip. When buying a merchandise in an internet shop, the cell phone exchanges information necessary for settlement with a server in an IC card settlement center, by subtracting an amount of settlement from a value charged to the IC chip of the cell phone.

Since electronic transaction by using a cell phone terminal is possible even in the absence of internet access function or radio communication function in the POS register terminal, settlement processing is accomplished by causing display of user data for credit card settlement in the form of two-dimensional barcodes, and reading out the displayed barcodes with a scanner of the POS register terminal. As a result, it is possible to perform credit card settlement upon buying a good at a shop through a cell phone terminal, without the need to carry a credit card.

[Patent Document 1] Japanese Unexamined Patent No. 2002-140635

[Patent Document 2] Japanese Unexamined Patent No. 2001-222765

[Patent Document 3] Japanese Unexamined Patent No. 2001-216567

However, in POS system permitting settlement with a conventional IC card, a special IC card settlement terminal must be connected to a POS register terminal of the shop, which requires to pay initial investment cost of a settlement terminal, and to provide a place for physical installation.

It is necessary, in the conventional IC card settlement POS system, to notify the result of transaction of settlement based on IC card from the shop POS system to the IC card settlement center. The system is therefore defective in that it requires construction of infrastructure for connecting to the IC card settlement center, in addition to the necessity to install an IC card settlement terminal on the shop side.

There is available another method of using a cell phone having a built-in IC chip to conduct settlement at the POS register terminal at a shop by accessing internet as in the purchase of goods in an internet shop. This method however requires the internet accessing function on the POS system side. Operation of the cell phone is complicated for the user, so that it is not suitable for real-time settlement at the shop POS register terminal requiring immediateness.

In a method of displaying settlement data in the form of two-dimensional barcodes at a cell phone terminal, and reading out the displayed data with the scanner of the POS Register terminal, thereby conducting settlement by a credit card, settlement data registered in advance through access to the server on the internet from the cell phone terminal is acquired by the user upon settlement and displayed on the screen. The access to the server in this case is carried out through exchange of HTML data, and this requires payment of packet charge in a large amount, thus causing a problem of an increased burden on the user.

SUMMARY OF THE INVENTION

Accordingly, it is an object of the present invention to provide a method, a system and a program of shop settlement which permit real-time settlement based on an IC chip built in a cell phone without the necessity to build infrastructure for connecting to the IC card settlement center on the shop side, or to provide a special IC card settlement terminal.

According to the present invention, there is provided a shop settlement method using a cell phone having a POS register terminal, a camera and an IC chip. This shop settlement method comprises:

a settlement request generating step of generating settlement request information including an amount of settlement upon receipt of an operational input of IC card settlement to the POS register terminal;

a request barcode generating step of generating a request barcode from the settlement request information and causing screen display or printing output by means of the POS register terminal;

a request barcode restoring step of restoring the settlement request information by imaging the request barcode by the camera of the cell phone;

an IC card settlement step of subtracting an amount of settlement of the settlement request information restored from a value charged to the IC chip of the cell phone;

a settlement response generating step of generating settlement response information including a balance after settlement of the IC chip;

a response barcode generating step of causing screen display by the cell phone by generating a response barcode from the settlement response information;

a response barcode restoring step of restoring the settlement response information by reading out the response barcode of the POS register terminal; and an IC card settlement ending step of confirming the end of IC card settlement from the restored settlement response information, thereby causing printing output of a receipt by the POS register terminal.

For the purpose of ensuring security, in the shop settlement method of the present invention, the settlement request generating step calculates and adds a first transaction certificate from the settlement request information; the request barcode generating step generates the request barcode after encrypting the settlement request information having the first transaction certificate added thereto; the request barcode restoring step restores the settlement request information from the encrypted settlement request information restored from the request barcode, and compares the first transaction certificate calculated from the restored settlement request information and the restored first transaction certificate to confirm reasonability of the POS register terminal. The settlement response generating step calculates and adds a second transaction certificate from the settlement response information; the response barcode generating step generating the response barcode after encrypting the settlement response information having the added second transaction certificate; and the response barcode restoring step restores the settlement response information from the encrypted settlement response information restored from the response barcode, and compares the second transaction certificate calculated from the restored settlement response information and the restored second transaction certificate, thereby confirming reasonability of the cell phone.

Encryption of the settlement request information and the settlement response information is performed by use of common key information set in the POS register terminal and the cell phone. The settlement request information includes a POS identifier, an amount of settlement, a date and time, and a POS transaction serial number, and the settlement response information includes a cell phone identifier, a balance after settlement, a date and time, an IC card transaction serial number, a POS identifier and a POS transaction serial number. The request barcode and the response barcode are two-dimensional barcodes or one-dimensional barcodes arranged in a plurality of stages.

The POS register terminal may request the POS server to conduct calculation of a first transaction certificate from the settlement request information, encryption of the settlement request information, generation of a request barcode from the encrypted settlement request information, restoration of the encrypted settlement response information from the response barcode, restoration of the settlement response information from the encrypted settlement response information, and calculation of the second transaction certificate from the settlement response information.

In order to confirm reasonability of cell phone processing before and after settlement, the shop settlement method of the present invention further comprises:
  an IC card terminal barcode generating step of calculating and adding a third transaction certificate, upon starting up a settlement based on an IC chip with a cell phone, from the IC card terminal information, and after encryption, generating an IC card terminal barcode to cause screen display thereof by the cell phone; and
  a cell phone reasonability confirming step of restoring the IC card terminal information by reading out the IC card terminal barcode by the POS register terminal, and transferring to the settlement request generating step after confirming reasonability of the cell phone by comparing the third transaction certificate calculated from the restored IC card terminal information and the restored third transaction certificate.

The IC card terminal information in this case includes a cell phone identifier, a balance before transaction, and an IC card transaction serial number. Reasonability of the cell phone processing is confirmed by ascertaining transition of the balance between before and after the settlement of the cell phone and the transition of the IC card transaction serial number during this period by means of the POS register terminal.

The present invention provides a shop settlement method in which the POS register terminal processing is simplified. This simplified-type shop settlement method comprises:
  a settlement request generating step of causing screen display of an amount of settlement and an encrypted POS register terminal information upon receipt of an operational input of IC card settlement at the POS register terminal;
  an IC card settlement step of subtracting the amount of settlement from a value charged to the IC chip, after confirming reasonability of the POS register terminal by Operationally entering the amount of settlement and encrypted POS register terminal information into the cell phone;
  a settlement response generating step of generating settlement response information including a balance after settlement of the IC chip;
  a response barcode generating step of causing screen display by the cell phone by generating a response barcode from the settlement response information;
  a response barcode restoring step of restoring the settlement response information by reading out the response barcode by the POS register terminal; and
  an IC card settlement ending step of causing printing output of a receipt by the POS register terminal by confirming the end of IC card settlement from the restored settlement response information.

More specifically, this simplified-type shop settlement method is characterized in that the user holding the cell phone enters the amount of settlement and the POS register terminal information screen-displayed by the POS register terminal into the cell phone for processing.

The present invention provides a shop settlement system using a cell phone having a POS register terminal, a camera, and an IC chip. This settlement system comprises:
  the POS register terminal having:
    a settlement request generating unit which generates settlement request information including an amount of settlement upon receipt of an operational input of IC card settlement; and
    a request barcode generating unit which causes screen display or printing output of a request barcode generated from the settlement request information;
  the cell phone having:
    a request barcode restoring unit which restores the settlement request information by imaging the request barcode by the camera;
    an IC card settlement unit which subtracts an amount of settlement of the settlement request information restored from a value charged to the IC chip;
    a settlement response generating unit which generates settlement response information including a balance after settlement of the IC chip; and
    a response barcode generating unit which generates a response barcode from the settlement response information and causes screen display thereof; and
  the POS register terminal having:
    a response barcode restoring unit which restores the settlement response information by reading out the response barcode; and
    an IC card settlement ending unit which causes printing output of a receipt by confirming the end of the IC card settlement from the restored settlement response information.

The present invention provides a shop settlement system in which the POS register terminal processing is simplified. This simplified-type shop settlement system comprising:
  The POS register terminal, having:
    a settlement request generating unit which causes screen display of an amount of settlement and an encrypted POS register terminal information upon receipt of an operational input of IC card settlement;

the cell phone, having:

an IC settlement unit which operationally enters the amount of settlement and encrypted POS register terminal information, and after confirming reasonability of the POS register terminal, subtracts the amount of settlement from a value charged to the IC chip;

a settlement response generating unit which generates settlement response information including a balance after settlement of the IC chip; and a response barcode generating unit which causes screen display by generating a response barcode from the settlement response information; and the POS register terminal, having:

a response barcode restoring unit which restores the settlement response information by reading out the response barcode; and an IC card settlement ending unit which causes printing output of a receipt by confirming the end of the IC card settlement from the restored settlement response information.

The present invention provides a program to be executed by a computer serving as a POS register terminal or a POS server. This program causes the computer to execute:

a settlement request generating step of generating settlement request information including an amount of settlement upon receipt of an operational input of IC card settlement;

a request barcode generating step of generating a request barcode from the settlement request information, and causing the POS register terminal to display the same on a screen or print the same as output;

a response barcode restoring step of reading out the response barcode screen-displayed on the cell phone and restoring the settlement response information; and an IC card settlement ending step of confirming the end of IC card settlement from the restored settlement response information and causing printing of a receipt from the POS register terminal.

The present invention provides a program to be executed by a computer of a cell phone having a camera and an IC chip. This program causes the computer to execute:

a request barcode restoring step of restoring the settlement request information by imaging the request barcode screen-displayed or printing-outputted at a POS register terminal by the camera;

an IC card settlement step of subtracting an amount of settlement of the restored settlement request information from a value charged to the IC chip;

a settlement response generating step of generating settlement response information including a balance after settlement of the IC chip; and a response barcode generating step of generating a response barcode from the settlement response information for screen display.

The present invention provides a simplified-type program to be executed by a computer serving as a POS register terminal or a POS server. This simplified-type program causes the computer to execute:

a settlement request generating step of causing screen display of an amount of settlement and encrypted POS register terminal information upon receipt of an operational input of IC card settlement;

a response barcode restoring step of restoring the settlement response information by reading out the response barcode screen-displayed on the cell phone; and an IC card settlement ending step of printing-outputting a receipt by the POS register terminal by confirming the end of IC card settlement from the restored settlement response information.

The present invention provides a simplified-type program to be executed by a computer of a cell phone having a camera and an IC chip. This simplified-type program causes the computer to execute:

an IC card settlement step of subtracting an amount of settlement from a value charged to an IC chip, after confirming reasonability of the POS register terminal from the operationally entered settlement amount and the encrypted POS register terminal information;

a settlement response generating step of generating settlement response information including a balance after settlement of the IC chip; and a response barcode generating step of generating a response barcode from the settlement response information and causing screen display thereof.

The details of the system and the program of the present Invention are basically the same as those of the shop settlement method of the present invention.

According to the present invention, the shop side has only to introduce middleware for executing processing necessary for IC card settlement on the POS register terminal side, without the need to modify the hardware for IC card settlement in the POS register terminal or install additional IC card settlement terminals for exclusive use. When introducing real-time settlement using IC card at the POS register terminal of the shop, therefore, it is possible to reduce the initial investment for the introducing shop.

Information necessary for IC card settlement processing by a cell phone is generated from the settlement request information on the POS side and is restored by imaging screen-displayed or printing-outputted barcodes by the camera of the cell phone. Therefore, the operation of acquiring the information necessary for IC card settlement through internet access becomes unnecessary. The user is therefore required to notify only the result of transaction to the IC card settlement center. It is thus possible to minimize the packet fee of the cell phone which forms a burden on the user.

User's operations include only the operation of imaging the settlement request barcode presented from the POS register terminal by the camera of the cell phone, and the operation of requesting the operator of the POS register terminal to read out the settlement response barcode displayed on the screen after IC card settlement.

Complicated operations for accessing the shop POS system site via internet are not necessary. Operation of the cell phone is therefore easy, thus making it possible to ensure immediateness necessary for real-time settlement at the shop POS register terminal.

The transaction certificate is added to the information necessary for settlement between the POS register terminal and the cell phone, and the combination is encrypted. Then, for example, two-dimensional barcodes are generated, which are mutually read out and deciphered for confirmation of reasonability of the other. This permits reliable prevention of an unfair transaction caused by IC card settlement and maintenance of a high security.

The above and other objects, features, and advantages of the present invention will become more apparent from the following detailed description with reference to the drawings.

BRIEF DESCRIPTION OF THE DRAWINGS

FIG. 8 is a descriptive view of settlement response information generated in the settlement response information generated in the settlement processing on the cell phone side shown in FIG. 6B;

FIGS. 10A and 10B are flowcharts of the cell phone processing corresponding to FIGS. 6A and 6B;

FIGS. 17A and 17B are flowcharts of cell phone processing corresponding to FIGS. 15A and 15B.

DETAILED DESCRIPTION OF THE PREFERRED EMBODIMENTS

Figure 1:
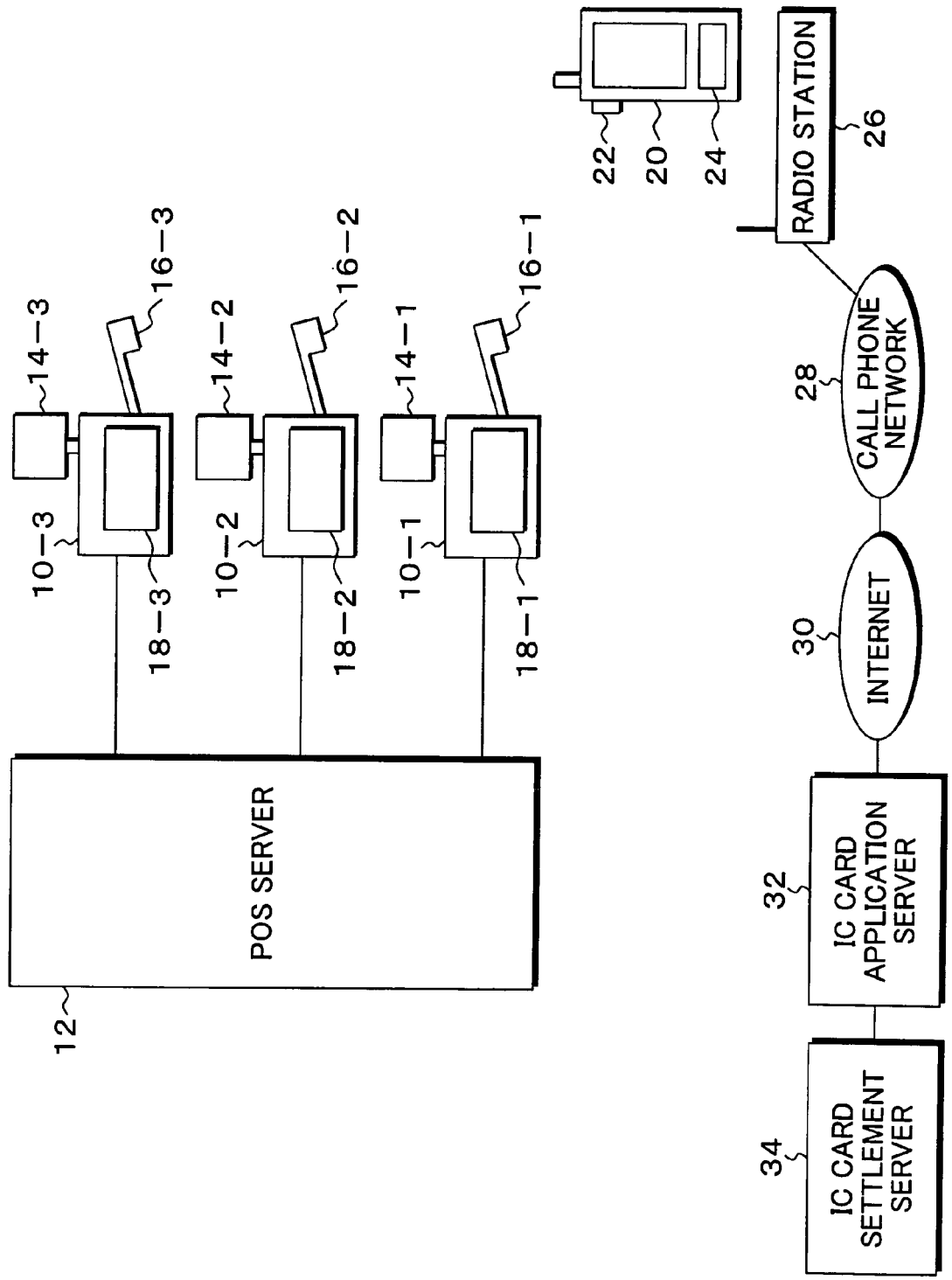
FIG. 1 is a descriptive view of the system configuration of the present invention.

FIG. 1 is a descriptive view of the system configuration to which the shop settlement processing using an IC chip built in a cell phone of the present invention is applied. In FIG. 1, POS register terminals 10-1, 10-2 and 10-3 are installed on the shop side, and are individually connected to a POS server 12. The POS register terminals 10-1 to 10-3 have display units 14-1 to 14-3 and scanners 16-1 to 16-3. Existing POS register terminals can be used with no modification.

In the present invention, IC card settlement middleware units 18-1 to 18-3 are installed for application of the settlement processing using IC chips built in the cell phone to the POS register terminals 10-1 to 10-3.

On the other hand, the cell phone 20 held by the user has a camera unit 22, and in addition, a semiconductor chip of an IC chip 24 is built in the cell phone 20. As the semiconductor chip of this IC chip 24, for example, an FeliCa chip (R) is applicable.

In order to execute the settlement processing using the IC chip 24 in response to a settlement request from the POS register terminal 10 of the present invention, the cell phone 20 causes downloading of the IC card settlement application program from the IC card application server 32 onto the cell phone 20 to permit execution. Access from the cell phone 20 to the IC card application server 32 is performed from the radio station 26 via a cell phone network 28 and the internet 30.

The IC card application server 32 is connected to an IC card settlement server 34. The result of the settlement processing using the IC chip 24 in the cell phone 20 is received by the IC card settlement server 34 for necessary data processing. The IC card application server 32 and the IC card settlement server 34 may be connected via the internet 30.

Figure 2:
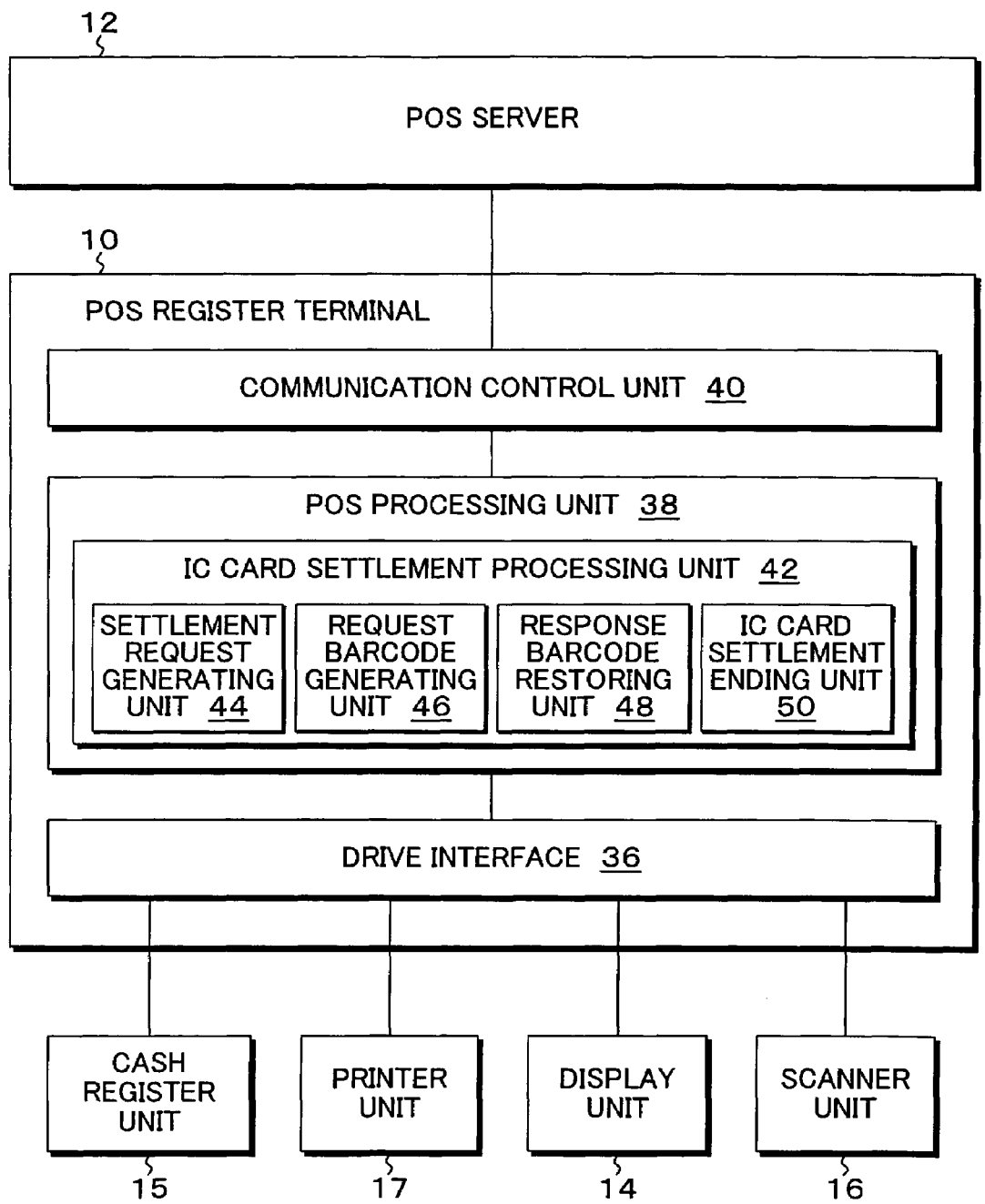
FIG. 2 is a block diagram of the POS register terminal shown in FIG. 1 having settlement processing functions of the present invention.

FIG. 2 is a block diagram of the functional configuration of the POS register terminal having the settlement processing function of the present invention. In FIG. 2, the POS register terminal 10 has a drive interface 36, a POS processing unit 38, and a communication control unit 40. A display unit 14, a cash register unit 15, a scanner unit 16 and a printer unit 17 are connected to the drive interface 36. The communication control unit 40 is connected to the POS server 12 for communication control.

An IC card settlement processing unit 42 achieved by the function of the IC card settlement middleware 18 shown in FIG. 1 is provided in the POS processing unit 38. This IC card settlement processing unit 42 comprises functions of a settlement request generating unit 44, a request barcode generating unit 46, a response barcode restoring unit 48, and an IC card settlement ending unit 50.

The settlement request generating unit 44 generates settlement request information including an amount of settlement upon receipt of an operational input of IC card settlement at the POS register terminal 10. The request barcode generating unit 46 generates two-dimensional barcode from the settlement request information, and screen-display on the display unit 14 or cause output of a sheet having printed two-dimensional barcode by means of the printer unit 17.

In a conventional POS register terminal, the goods purchased by the customer and an amount of settlement have been displayed on the screen upon fixing of an amount of settlement in a transaction with a customer. In the present invention, in contrast, the settlement request information including an amount of settlement apart from the above is generated, and symbols such as two-dimensional barcodes are generated on the basis of that information for screen display.

The settlement request generating unit 44 calculates and adds a transaction certificate from the settlement request information. The request barcode generating unit 46 generates a two-dimensional barcode after encrypting the settlement request information having the transaction certificate added thereto. This encryption when generating the two-dimensional barcode makes it possible to keep security when screen-displaying or printing-outputting the two-dimensional barcode, and addition of a transaction certificate calculated with a prescribed algorithm to the settlement request information permits confirmation of reasonability of the POS register terminal 10 in the cell phone 20 serving as a restoring side.

The two-dimensional barcode of the settlement request information screen-displayed or printing-outputted as described above in the request barcode generating unit 46 is restored through imaging by the camera unit 22 of the cell phone 20, thus enabling to conduct an IC card settlement processing in the cell phone 20.

For the two-dimensional barcode of the settlement response information displayed on the cell phone 20 after the completion of the IC card settlement processing, the response barcode restoring unit 48 restores the settlement response information by reading out the two-dimensional barcode of the displayed settlement response information. The IC card settlement ending unit 50 confirms the end of the IC card settlement from the restored settlement response information and causes the printer unit 17 to printing-output the receipt.

Figure 3:
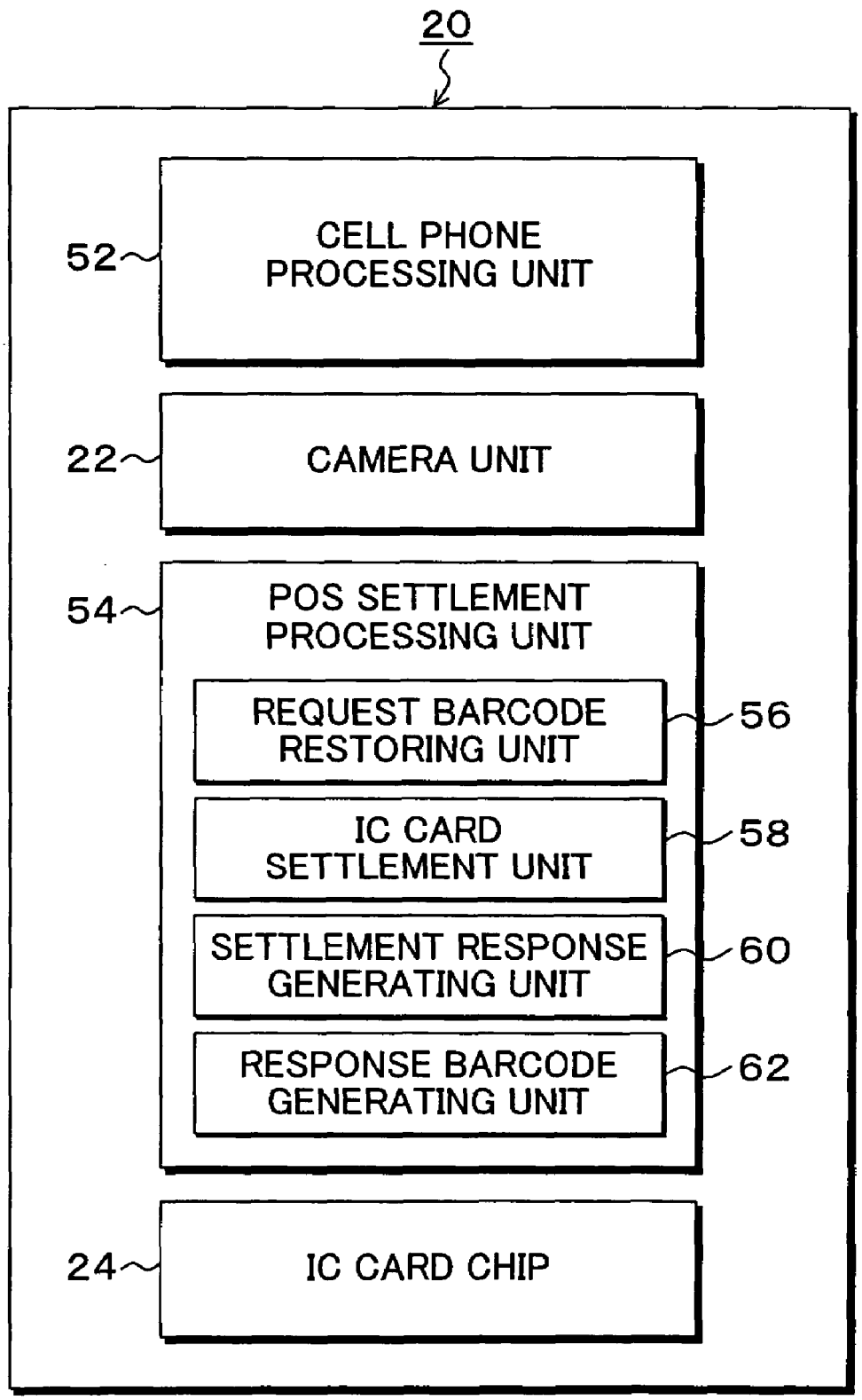
FIG. 3 is a block diagram of the cell phone shown in FIG. 1 having settlement processing functions of the present invention.

Also for the two-dimensional barcode of the settlement response information read out from the cell phone 20, addition of the transaction certificate and encryption have been performed. The response barcode restoring unit 48 restores the settlement response information from the encrypted settlement response information restored from the two-dimensional barcode, confirms reasonability of the cell phone 20 from the added transaction certificate, and ascertains thereafter the end of the IC card settlement. FIG. 3 is a block diagram of the functional configuration of a cell phone having a settlement processing function of the present invention. In FIG. 3, the cell phone 20 has a cell phone processing unit 52, a camera unit 22, a POS settlement processing unit 54 achieved by the function as an application program for realizing settlement processing of the present invention, and an IC chip 24.

In the POS settlement processing unit 54, functions including a request barcode restoring unit 56, an IC card settlement unit 58, a settlement response generating unit 60, and a response barcode generating unit 62 are provided. The request barcode restoring unit 56 restores the settlement request information by imaging the two-dimensional barcode screen-displayed or printing-outputted by the POS register terminal 10 by means of the camera unit 22 of the cell phone 20.

The IC card settlement unit 58 subtracts the amount of settlement of the settlement request information restored from a value charged to the IC chip 24. The settlement response generating unit 60 generates settlement response information including a balance after the settlement of the IC chip 24. The response barcode generating unit 62 generates a two-dimensional barcode from the settlement response information, and causes the screen of the cell phone 20 to display the same. At this point in time, the IC card settlement unit 58 accesses the IC card settlement server 34 via the IC card application server 32 shown in FIG. 1 to notify the result of IC card settlement processing after subtraction of the amount of settlement.

The settlement response generating unit 60 calculates and adds a transaction certificate from the settlement response information. The response barcode generating unit 62 encrypts the settlement response information having the transaction certificate added thereto, and then, generates a two-dimensional barcode. This encryption upon generation of the two-dimensional barcode makes it possible to maintain security when screen-displaying the same on the cell phone 20. Addition of the transaction certificate calculated with a prescribed algorithm to the settlement response information permits confirmation of reasonability of the cell phone 20 as an IC card terminal at the POS register terminal 10 serving as the restoring side.

Figure 4:
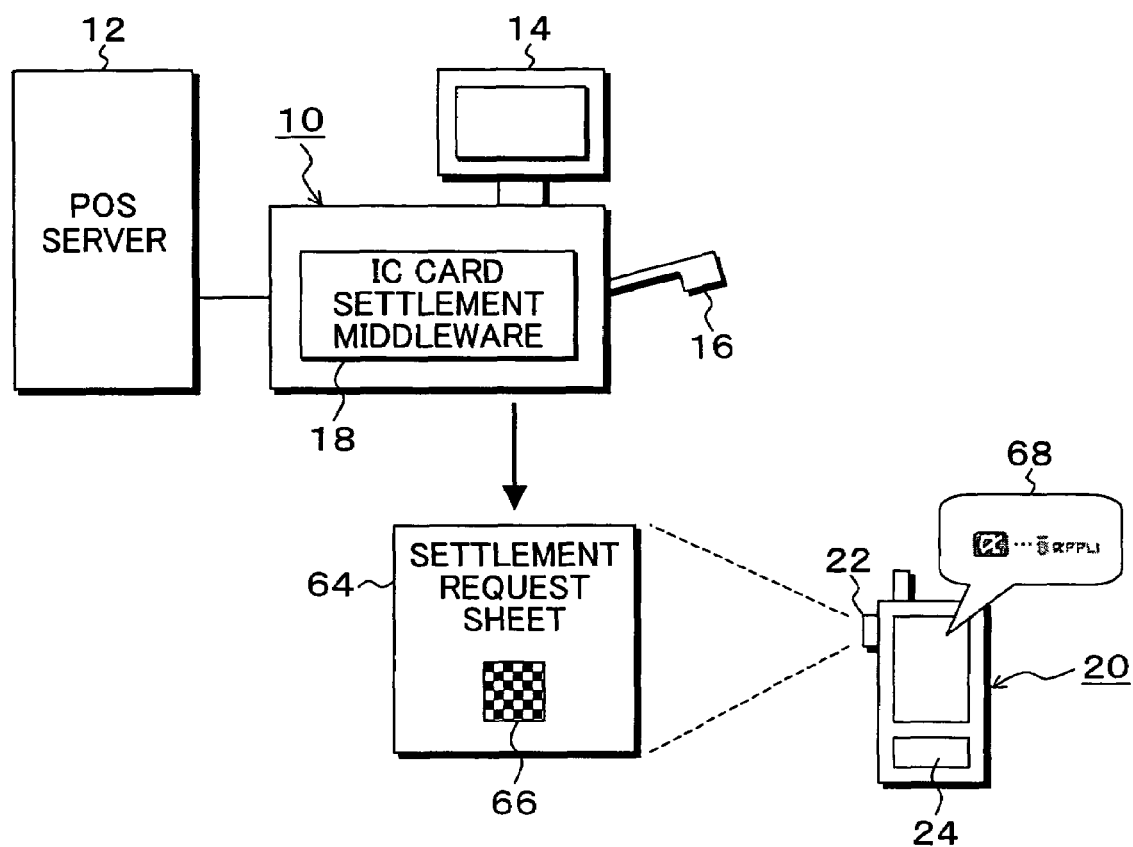
FIG. 4 is a descriptive view of transfer processing of the settlement request information by two-dimensional barcodes from the POS register terminal to the cell phone.

FIG. 4 is a descriptive view of the transfer processing of the settlement request information by the two-dimensional barcode from the POS register terminal to the cell phone in the present invention. In FIG. 4, the operator of the POS register terminal 10 reads out the barcode of a good that the user holding the cell phone 20 is purchasing through the scanner unit 16. Upon the completion of read, he presses down an IC card settlement button provided in the POS register terminal 10 upon receipt of a request for IC card settlement from the user, and IC card settlement middleware 18 is started up, and a settlement request sheet 64 having a two-dimensional barcode 66 printed thereon, which is generated from the settlement request information is outputted.

On the other hand, the user has operated the cell phone 20 to activate the IC card settlement application 68. In this state, the settlement request sheet 64 printing-outputted from the POS register terminal 10 is received, and the two-dimensional barcode 66 thereof is imaged by the camera unit 22. The settlement request information is restored by the IC card settlement application 68 from the two-dimensional barcode 66 imaged by the camera unit 22, and settlement processing of subtracting the amount of settlement from a value of the IC chip 24 is carried out.

Figure 5:
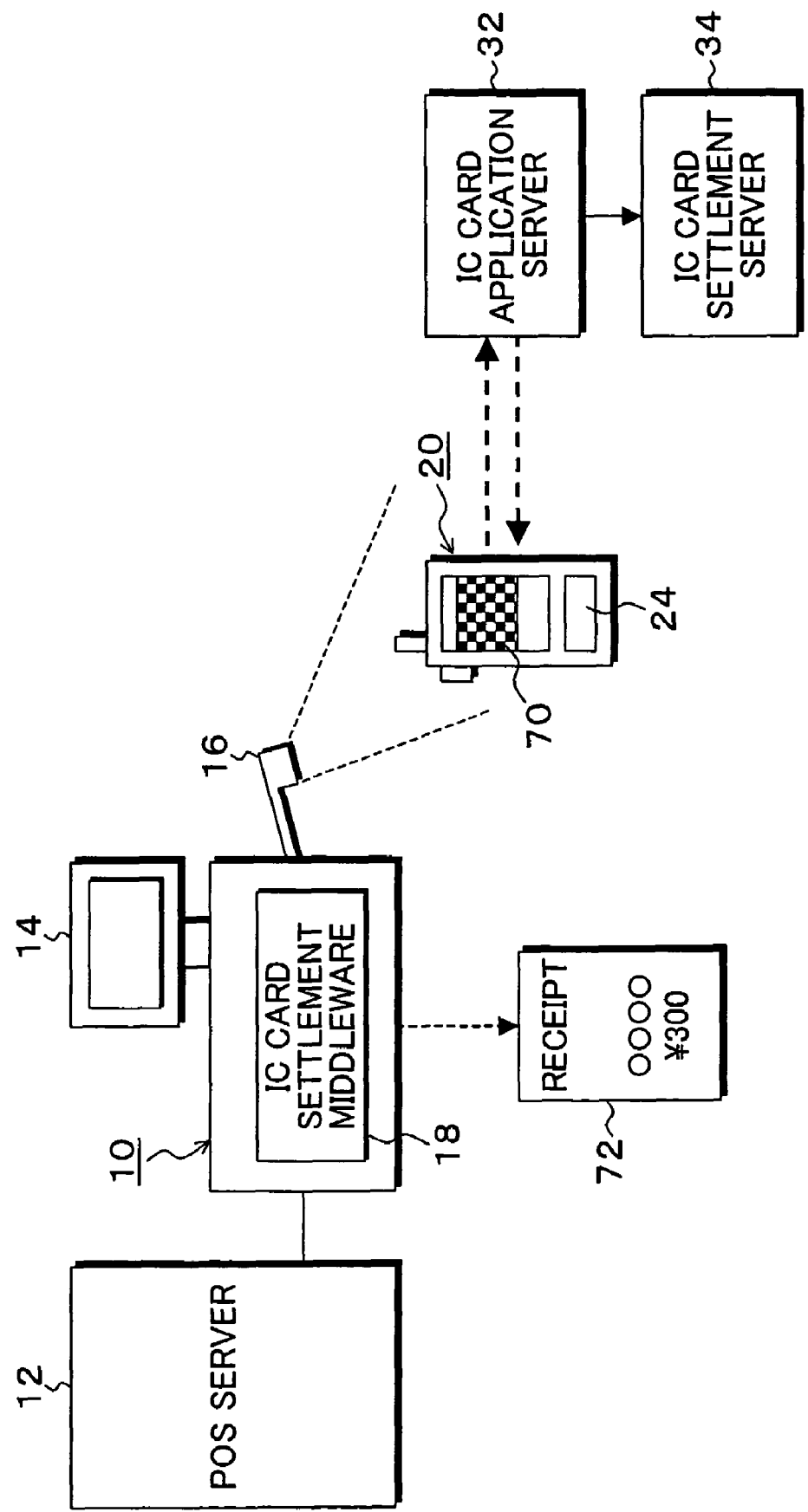
FIG. 5 is a descriptive view of the IC card settlement with a cell phone, and the transfer processing of the settlement response information by two-dimensional barcodes to the POS register terminal after settlement.

FIG. 5 is a descriptive view of the IC card settlement with a cell phone performed next to that shown in FIG. 4 and the transfer processing of the settlement response information by two-dimensional barcode to the POS register terminal after settlement. In FIG. 5, when the amount of settlement restored in the cell phone 20 is subtracted from the value of the IC chip 24, the result of IC card settlement processing is notified to the IC card settlement server 34 via the IC card application server 32. Subtraction of the value from the IC chip 24 may be carried out after the verification processing through access from the cell phone 20 to the IC card application server 32.

Upon the completion of the IC card settlement processing, the IC card settlement application 68 of the cell phone 20 generates settlement response information including a balance after transaction, and after encrypting the same by adding a transaction certificate, displays the same as a two-dimensional barcode 70 on the screen of the cell phone 20. The operator of the POS register terminal 10 causes the scanner unit 16 of the POS register terminal 10 to read in the two-dimensional barcode 70 screen-displayed on the cell phone 20.

The IC card settlement middleware 18 of the POS register terminal 10 restores the settlement response information from the two-dimensional barcode 70 of the cell phone 20 read in by the scanner unit 16, and upon confirmation of the end of settlement by the IC chip 24, printing-outputs a receipt 72, thus completing a series of settlement processes.

Among the operations for settlement processing between the POS register terminal 10 and the cell phone 20 shown in FIGS. 4 and 5, the operator of the POS register terminal 10 presses down the IC card settlement button after read-in of the product barcode to cause output of a settlement request sheet 64 having the two-dimensional barcode 66 printed thereon. The only operation required for the operator is to cause the scanner unit 16 to read in the screen requested by the user holding the cell phone. On the other hand, the user holding the cell phone 20 has only to image the two-dimensional barcode 66 of the settlement request sheet 64 by the camera unit 22 of the cell phone, and ask the operator of the POS register terminal 10 to confirm after imaging the two-dimensional barcode 70 displayed on the screen of the cell phone 20.

Figure 6A:
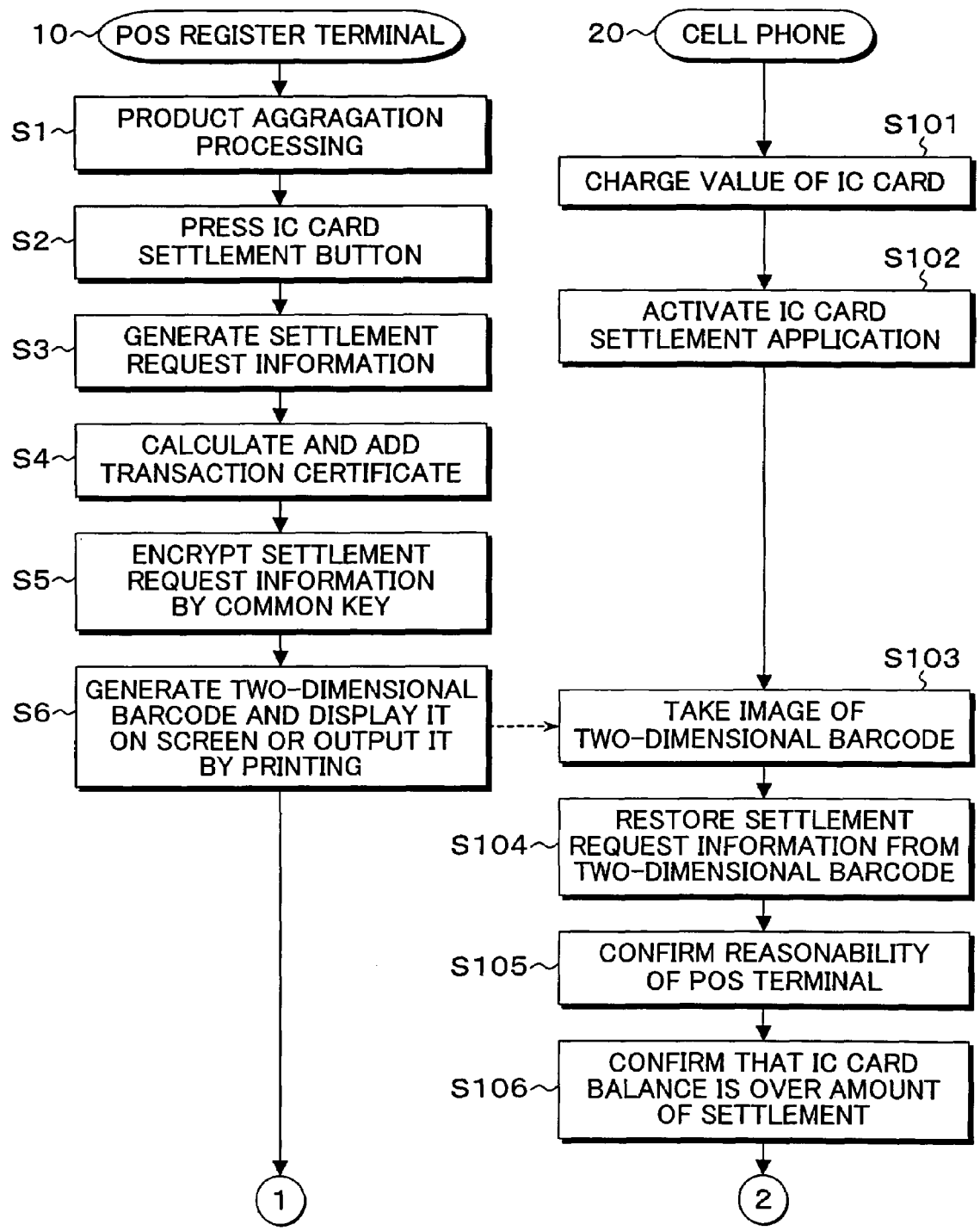
FIG. 6A is a time chart of an embodiment of settlement processing in the present invention between the POS register terminal and the cell phone.
Figure 6B:
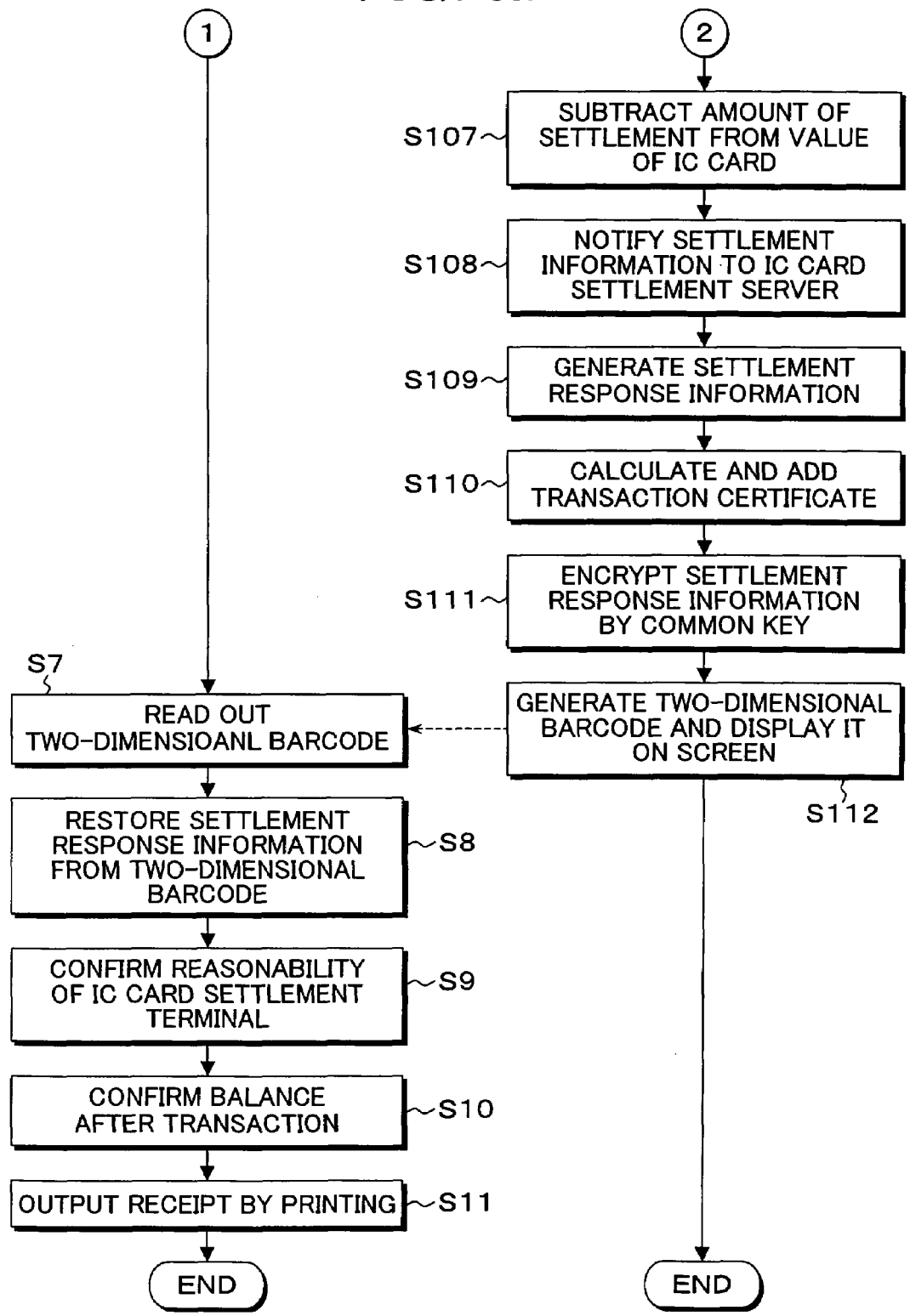
FIG. 6B is a time chart of an embodiment of settlement processing of the present invention following FIG. 6A.

FIGS. 6A and 6B are time charts of an embodiment of the settlement processing in the present invention between the POS register terminal and the cell phone.

In FIG. 6A, when the IC card settlement button is pressed down in step S2 after the completion of the product aggregation processing in step S1, the POS register terminal 10 generates settlement request information in step S3, and after calculating and adding a transaction certificate in step S4, encrypts the settlement request information by means of the common key in step S5, followed by screen display or printing output by generating two-dimensional barcode in step S6.

On the other hand, in the cell hone 20, the value in a prescribed amount is charged in advance by use of a bank terminal or the like in the IC chip in step S101. While the operator performs processing at the POS register terminal 10, the IC card settlement application 68 is activated in step S102.

When the two-dimensional barcode has been displayed on the screen or printed for output as in step S6 of the POS register terminal 10, this is imaged by the camera unit 22 of the cell phone 20 in step S103. After imaging the two-dimensional barcode, the settlement request information is restored from the two-dimensional barcode in step S104, and reasonability of the POS register terminal 10 is confirmed from the transaction certificate added to the settlement request information restored in step S105.

Then, after confirming that the value balance of the IC chip 24 is over the amount of settlement in step S106, the amount of settlement is subtracted from the value of the IC chip 24 in step S107. The result of the settlement processing is notified to the IC card settlement server 34 in step S108. Then, in step S109, settlement response information including a balance after the settlement is generated, and in step S110, a transaction certificate is calculated and added. In step S111, the settlement response information is encrypted by means of the common key. A two-dimensional barcode is generated from the settlement response information encrypted in step S112 shown in FIG. 6B, and displayed on the screen.

In the POS register terminal 10, on the other hand, the two-dimensional barcode displayed on the screen of the cell phone 20 in step S7 shown in FIG. 6B is read out. The settlement response information is restored from the two-dimensional barcode in step S8. In step S9, reasonability of the IC card settlement terminal, i.e., the cell phone 20 is confirmed from the transaction certificate added to the restored settlement response information. In step S10, the value balance of the IC chip 24 after the transaction is confirmed, and finally, a receipt is printed for output in step S11.

Figure 7:
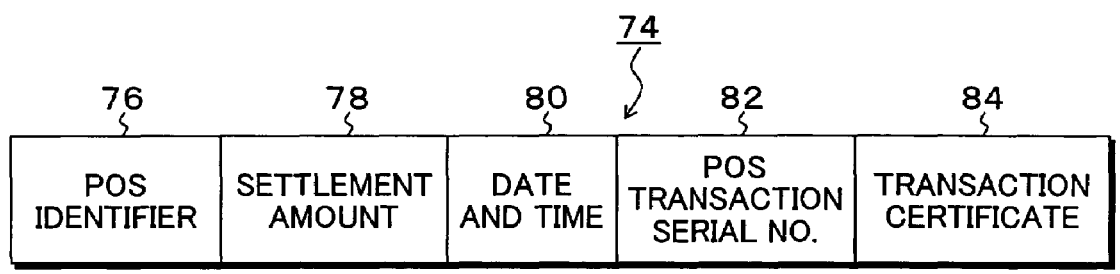
FIG. 7 is a descriptive view of settlement request information generated by settlement processing on the POS register terminal side shown in FIG. 6A.

FIG. 7 is a descriptive view of settlement request information generated by the settlement processing on the POS register terminal side. The settlement request information 74 comprises a POS identifier 76, an amount of settlement 78, a date 80, and a POS transaction serial number 82, and a transaction certificate 84 calculated with a prescribed algorithm using a common key on the basis of data from the POS identifier 76 to the POS transaction serial number 82 are added thereto.

FIG. 8 is a descriptive view of the settlement response information generated in the settlement processing on the cell phone side shown in FIG. 6B. The settlement response information 86 comprises a cell phone identifier 88, a balance after transaction 90, a date 92, an IC card transaction serial number 94, a POS identifier 96, and a POS transaction serial number, and a transaction certificate 100 calculated with the same algorithm as that on the POS register terminal side on the basis of data from the cell phone identifier 88 to the POS transaction serial number 98 is added thereto.

Figure 9A:
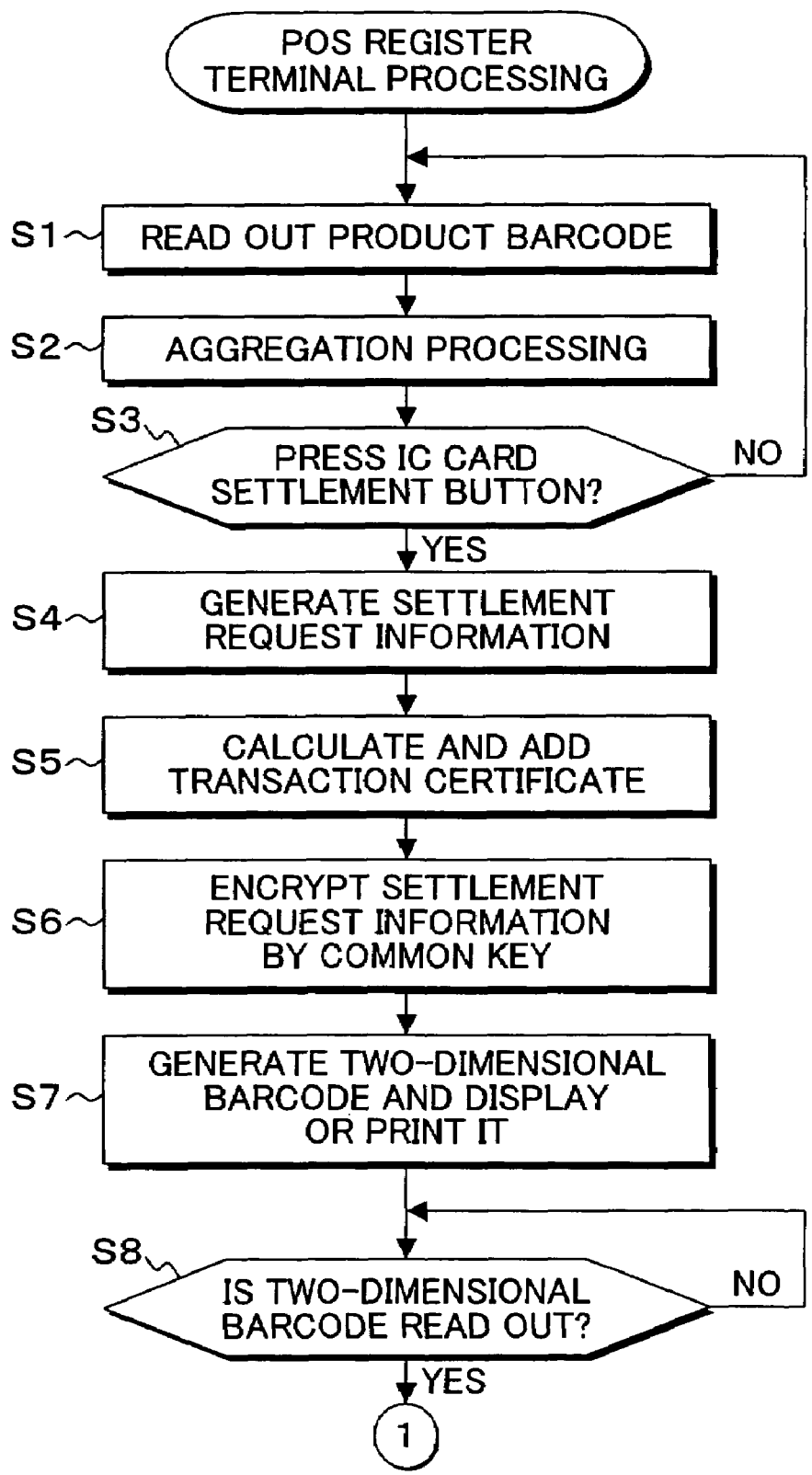
FIGS. 9A and 9B are flowcharts of the POS register terminal processing corresponding to FIGS. 6A and 6B.
Figure 9B:
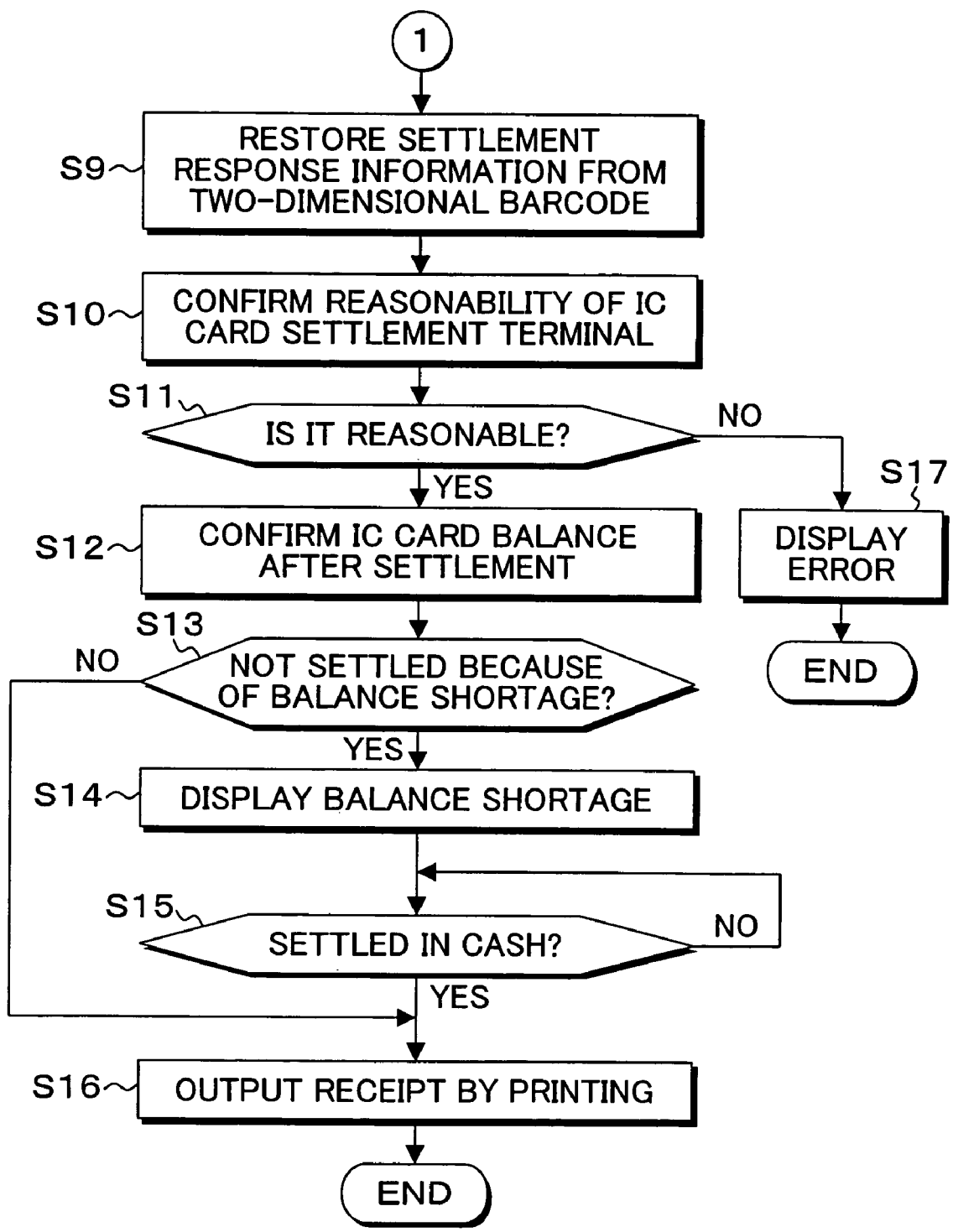

FIGS. 9A and 9B are flowcharts of the POS register terminal processing corresponding to FIGS. 6A and 6B. In FIGS. 9A and 9B, the POS register terminal processing reads out the product barcode in step S1. After an aggregation processing in step S2, pressing of the IC card settlement button is waited for in step S3.

After the completion of read-out of the barcodes of all the goods, pressing of the IC card settlement button is determined in step S3. A settlement request information is generated in step S4. After calculating a transaction certificate in step S5, the settlement information is encrypted by a common key in step s6, and in step S7, a two-dimensional barcode is generated and displayed on the screen or printed for output. These processes of steps S1 to S7 form transfer processing of the settlement request information from the POS resister terminal 10 to the cell phone 20.

Upon the completion of the transfer processing of the settlement request information as described above, read processing of the two-dimensional barcode displayed on the screen of the cell phone 20 is waited for in step S8. When the two-dimensional barcode displayed on the screen of the cell phone 20 is read out, the settlement response information is restored from the two-dimensional barcode in step S9, and reasonability of the IC card settlement terminal, i.e., the cell phone 20 is confirmed from the transaction certificate added to the restored settlement response information in step S10.

If reasonability is confirmed in step S11, the IC card balance after settlement is confirmed in step S12. Whether or not settlement cannot be made because of shortage of balance is checked in step S13. If the balance is not in short, the process advances to step S16 and the receipt is printed for output. If settlement cannot be made because of balance shortage, the fact of balance shortage is displayed on the screen in step S14 to notify the user, and a settlement in cash is waited for in step S15. Then, the receipt is printed for output in step S16.

It is needless to mention that, if reasonability of the IC card settlement terminal could not be confirmed in step S11, the error is displayed in step S17 to notify the user that settlement cannot be performed by IC chip, and settlement in cash is requested to the user.

Figure 10B:
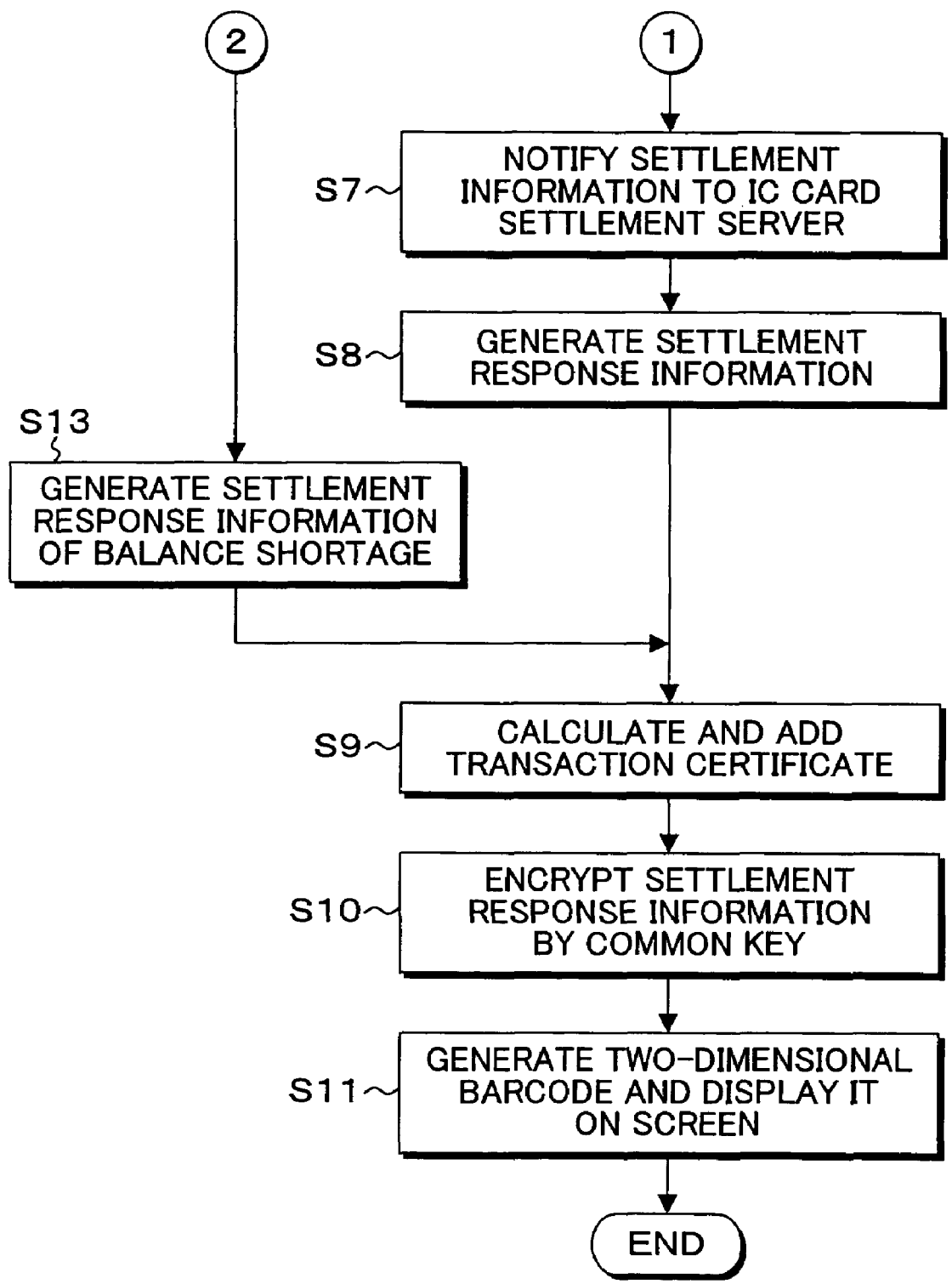

FIGS. 10A and 10B are flowcharts of the cell phone processing corresponding to FIGS. 6A and 6B. In FIGS. 10A and 10B, the cell phone processing comprises restoring the settlement request information from the two-dimensional barcode in step S2, by imaging the two-dimensional barcode displayed on the screen or printed for output in the settlement request processing at the POS register terminal 10 in step S1 by the camera unit 22. Then, reasonability of the POS register terminal 10 is confirmed from the transaction certificate added to the restored settlement request information in step S3.

If reasonability is confirmed in step S4, it is determined whether or not the value balance of the IC chip 24 is over the amount of settlement. If it is over the amount of settlement, the process advances to step S6, and the amount of settlement is subtracted from the value of the IC chip 24. In step S7, the result of the settlement processing is notified to the IC card settlement server 34. Then, the settlement response information including the balance after settlement is generated in step S8. After calculating and adding the transaction certificate in step S9, the settlement response information is encrypted by the use of the common key in step S10, and the two-dimensional barcode is generated in step S11 for display on the screen.

When reasonability is not confirmed for the POS register terminal 10 in step S4, the error is displayed in step S12, then the presence of an abnormality in the POS register terminal is notified to the user. In this case, settlement would be accomplished in cash.

When the value balance of the IC chip 24 is under the amount of settlement in step S5, settlement response information of balance shortage is generated in step S13. A transaction certificate is calculated and added in step S9, and the settlement response information is encrypted by the common key in step S10. In step S11, a two-dimensional barcode is generated for display on the screen. In step S13, a processing in which the user is urged to select a combination settlement of the value balance of the IC chip 24 and cash may be added in step S13.

Figure 11A:
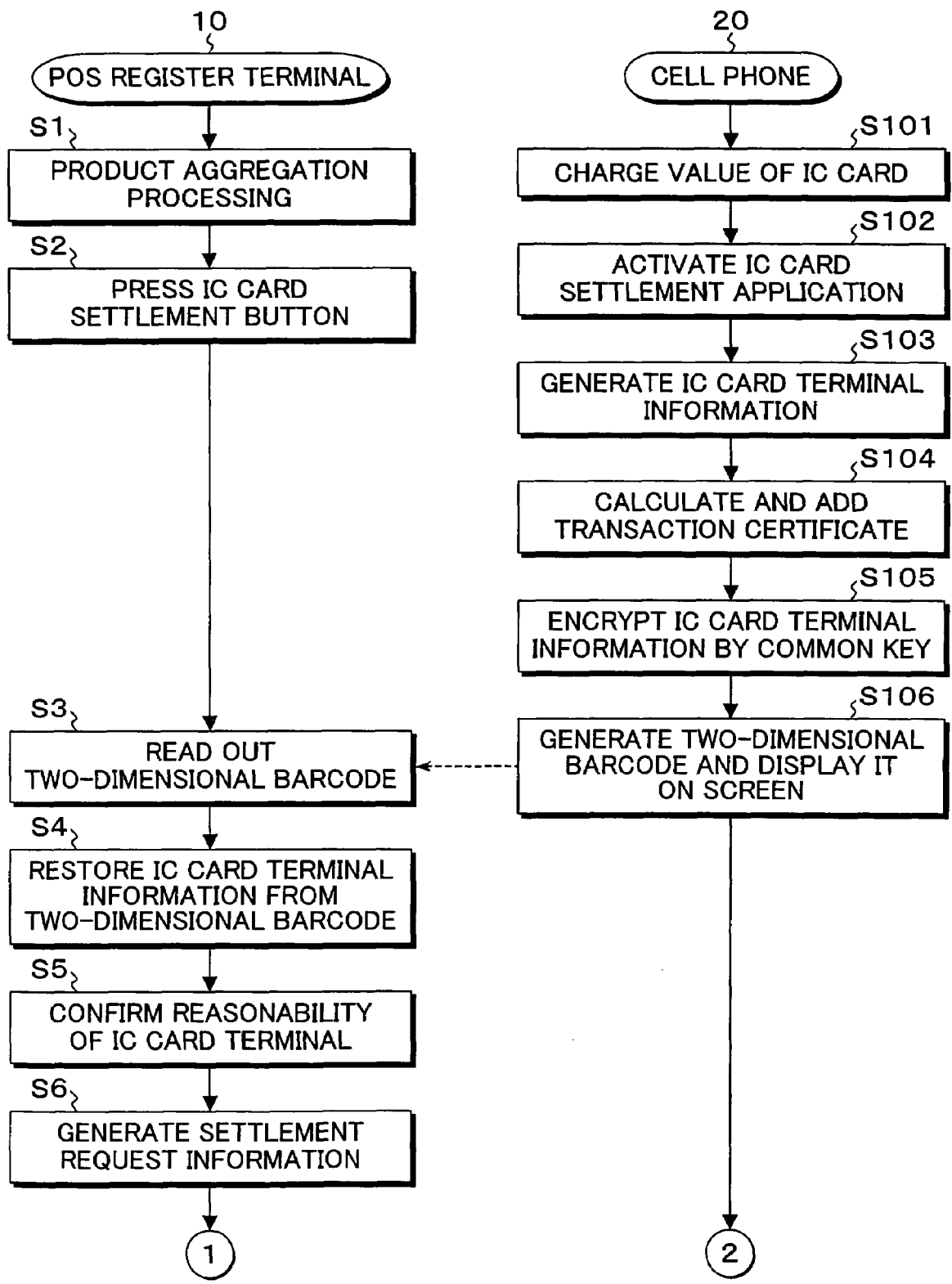
FIGS. 11A and 11B are time charts of another embodiment of settlement processing of the present invention between the POS register terminal and the cell phone.
Figure 11B:
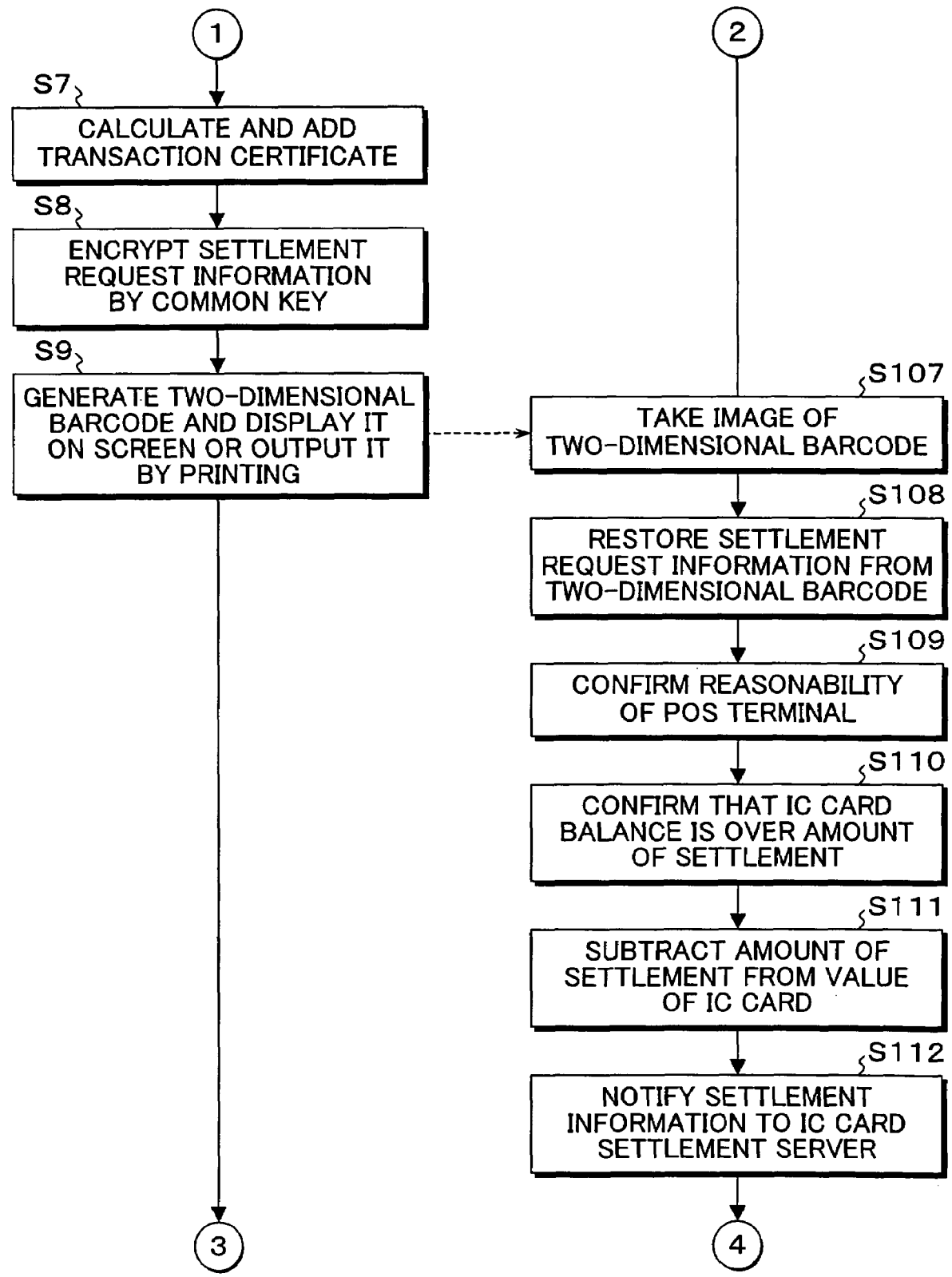
Figure 11C:
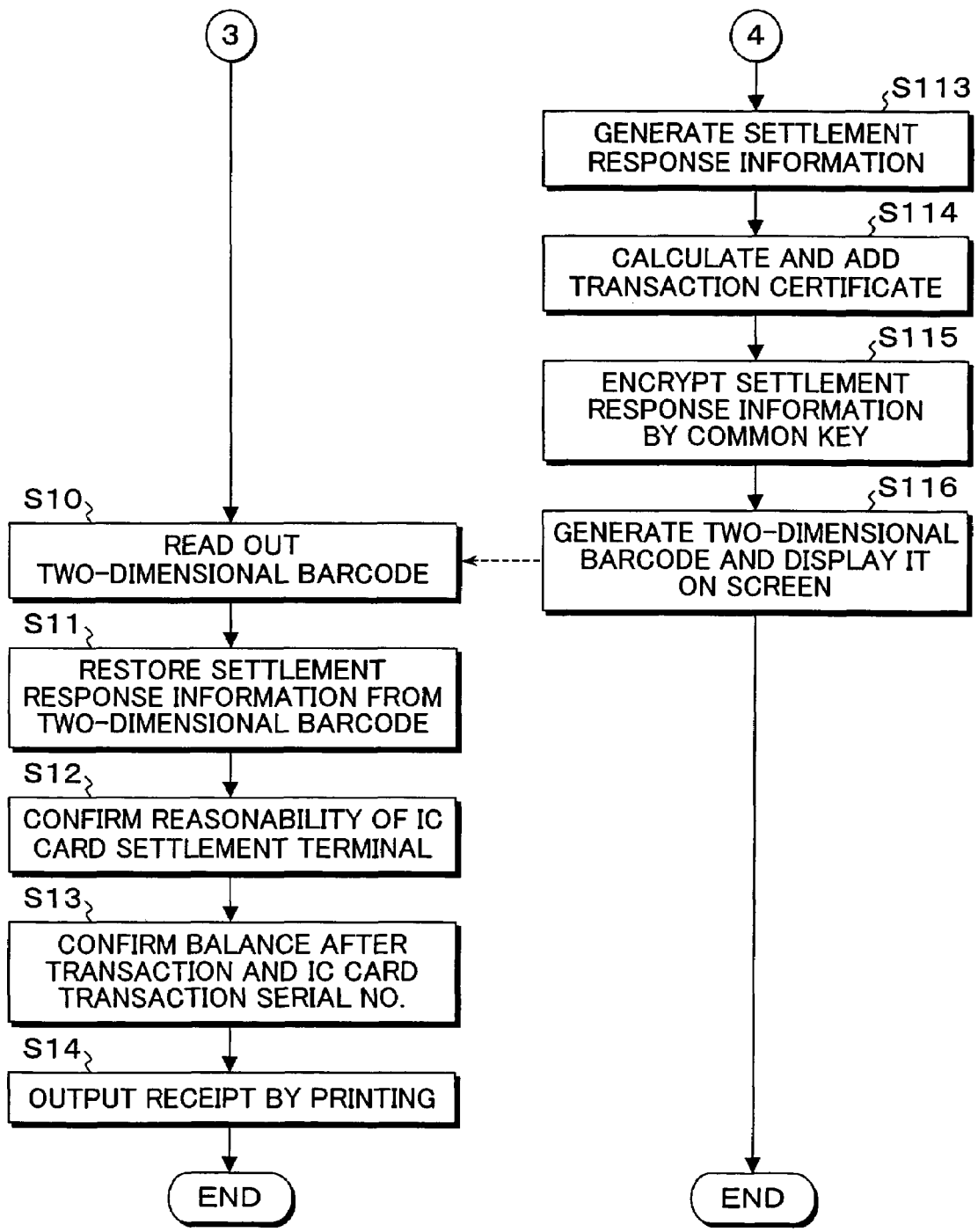
FIG. 11C is a time chart of an embodiment of the settlement processing of the present invention following FIGS. 11A and 11B.

FIGS. 11A, 11B and 11C are time charts of another embodiment of settlement processing of the present invention between the POS register terminal and the cell phone. This embodiment is characterized in that reasonability of the cell phone processing is to be confirmed before and after the IC card settlement processing by the POS register terminal 10.

In FIGS. 11A and 11B, when the IC card settlement button is pressed down in step S2 after the product aggregation processing in step S1, the POS register terminal 10 reads out the two-dimensional barcode for confirming reasonability of the cell phone 20 in step S3.

In the cell phone 20, therefore a value in a prescribed amount has been charged in advance to the IC chip 24 by use of a bank terminal or the like in step S101, and upon settlement at the POS register terminal 10, the IC card settlement application 68 is activated in step S102, thereby generating IC card terminal information in step S103. After calculating and adding a transaction certificate in step S104, the IC card terminal information is encrypted by the common key in step s105, and a two-dimensional barcode is generated in step s106 and displayed on the screen.

The two-dimensional barcode of the cell phone 20 is read out at the POS register terminal 10 in step S3. The IC card terminal information is restored from the two-dimensional barcode in step S4, and reasonability of the cell phone 20 is confirmed from the transaction certificate added to the restored IC card terminal information in step S5.

After confirmation of reasonability of the cell phone 20 in step S5, settlement request information is generated in step S6, and a settlement processing is carried out by transfer using the two-dimensional barcode information between the POS register terminal 10 and the cell phone 20. As a result, the POS register terminal 10 processes from step S6 shown in FIGS. 11A and 11B to step S12 shown in FIG. 11C are the same as those from step S3 shown in FIG. 6A to step S9 shown in FIG. 6B. Transaction of the value balance of the IC chip 24 before and after the settlement and transition of the IC card transaction serial number are confirmed in step S13, and reliability of settlement is improved by confirming the cell phone processing. Finally, the receipt is printed for output in step S14.

Similarly, the processes of the cell phone 20 from step S107 shown in FIGS. 11A and 11B to step S116 shown in FIG. 11C are the same as those from step S103 shown in FIG. 6A to step S112 shown in FIG. 6B.

Figure 12:
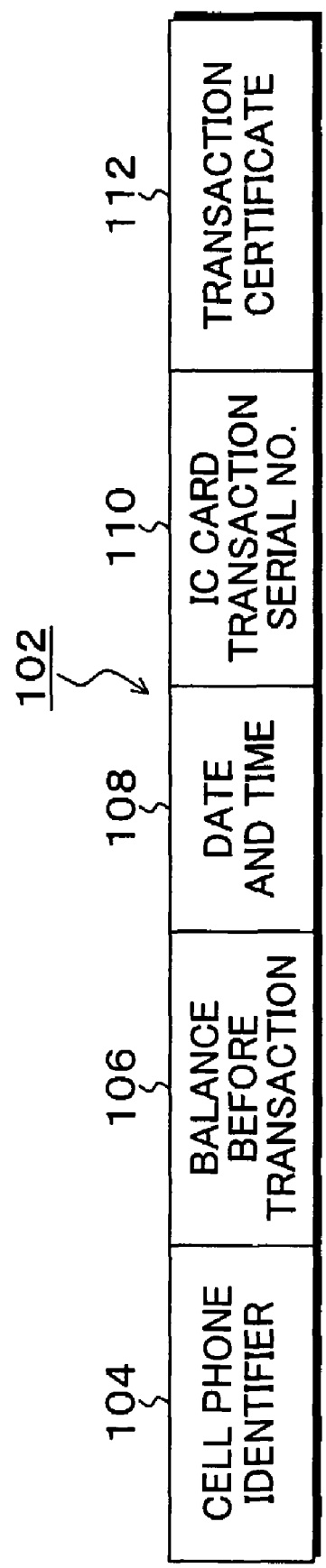
FIG. 12 is a descriptive view of IC card terminal information generated through confirmation of reasonability of the cell phone processing shown in FIGS. 11A and 11B.

FIG. 12 is a descriptive view of the IC card terminal information generated upon confirming reasonability of the cell phone processing shown in FIGS. 11A and 11B. The IC card terminal information 102 comprises a cell phone identifier 104, a balance before transaction 106, a date 108, and an IC card transaction serial number 110, and a transaction certificate 112 calculated with a prescribed algorithm on the basis of the data from the cell phone identifier 104 to the IC card transaction serial number 110 is added thereto.

The algorithm for calculating the transaction certificate 112 is of course the same as the calculation algorithm of the transaction certificate 84 in the settlement request information 174 in FIG. 7 and the transaction certificate 100 in the settlement response information 86 shown in FIG. 8.

Figure 13A:
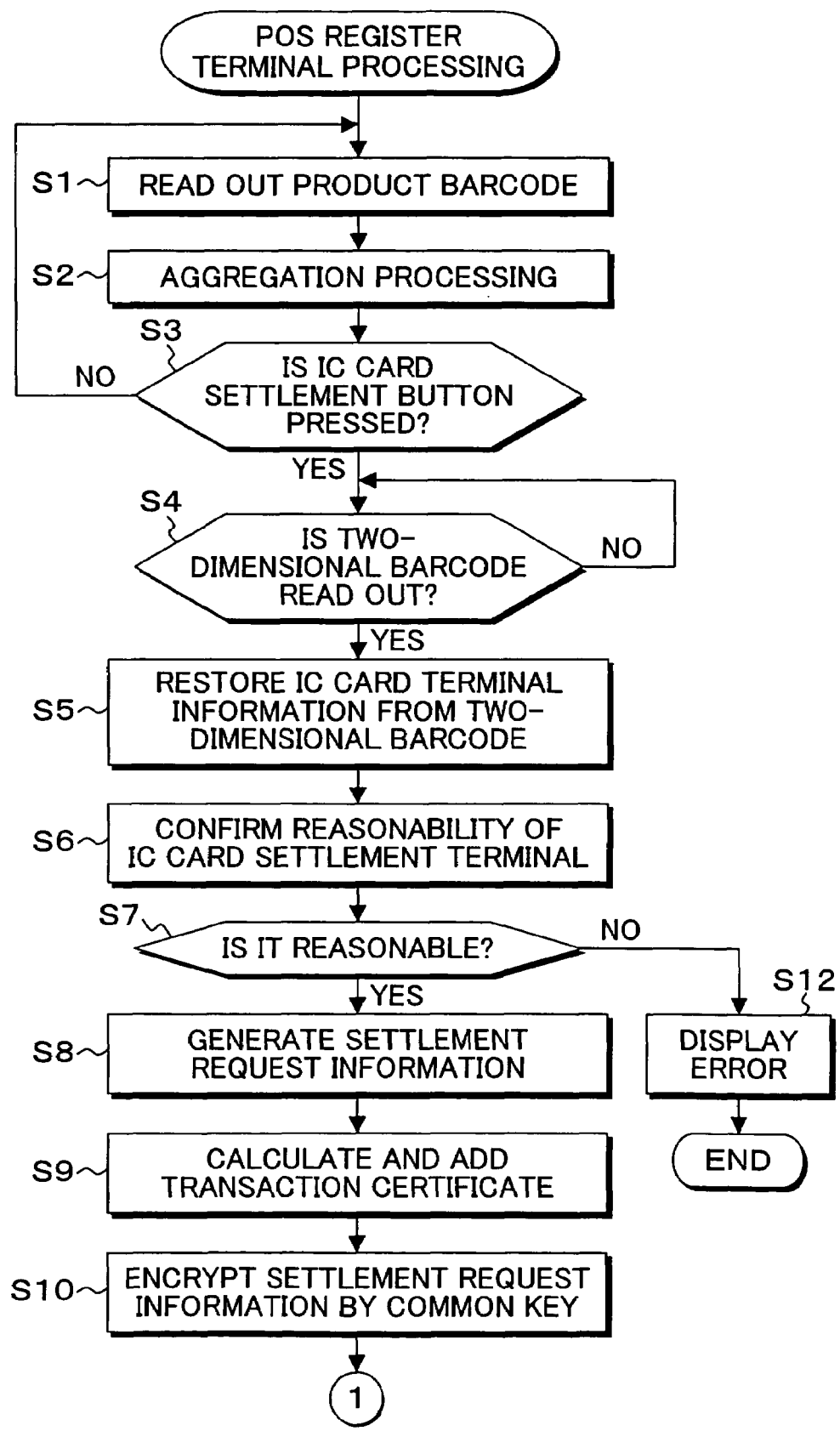
FIG. 13A is a flowchart of POS register terminal processing corresponding to FIGS. 11A to 11C.

FIG. 13A is a flowchart of the POS register terminal processing corresponding to FIGS. 11A, 11B and 11C. In the POS register terminal processing shown in FIG. 13A, the product barcode is read out in step S1, and after an aggregation processing in step S2, pressing of IC card settlement button is waited for in step S3.

Upon the completion of read of all the product barcode, pressing of the IC card settlement button is determined in step S3, and reading processing of the two-dimensional barcode displayed on the screen of the cell phone 20 is waited for in step S4. When the two-dimensional barcode displayed on the screen of the cell phone 20 is read out, the IC card terminal information is restored from the two-dimensional barcode in step S5. Reasonability of the IC card settlement terminal, i.e., the cell phone 20 is confirmed from the transaction certificate added to the restored IC card terminal information in step S6.

Figure 13B:
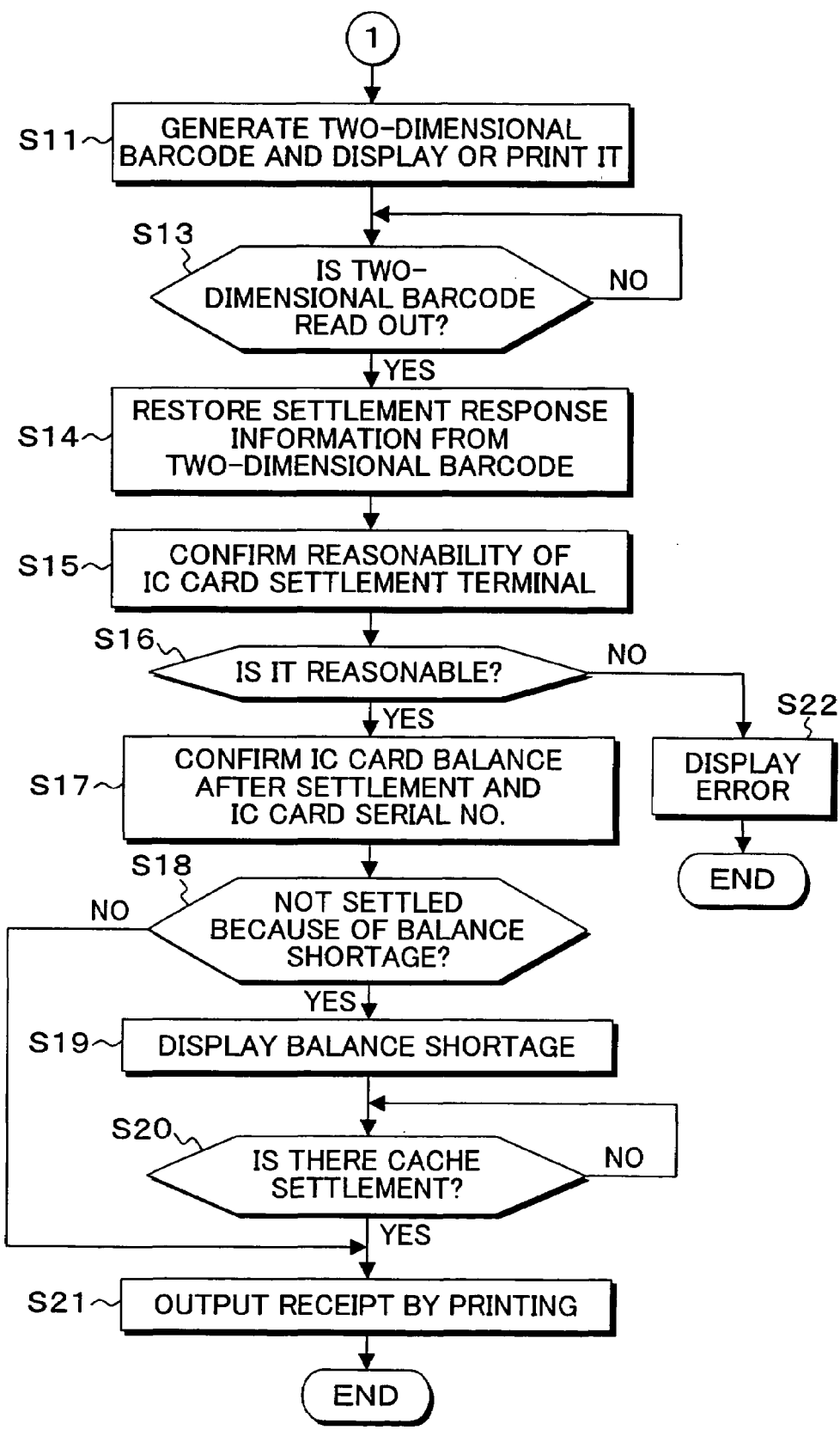
FIG. 13B is a flowchart of POS register terminal processing following FIG. 13A.

If reasonability is confirmed in step S7, the process advances to the processing of step S8 and the subsequent steps. If not reasonable, the error is displayed in step S12, and the fact is communicated to the user that settlement cannot be based on an IC chip, and would request the user to perform settlement in cash. The processes from step S8 shown in FIG. 13A to step S22 shown in FIG. 13B are the same as those from step S4 shown in FIG. 9A to step S17 shown in FIG. 9B. In step S17 shown in FIG. 1 3B, transition of the value balance of the IC chip 24 before and after the settlement and transition of the IC card transaction serial number are checked to confirm reasonability of the cell phone processing.

Figure 14A:
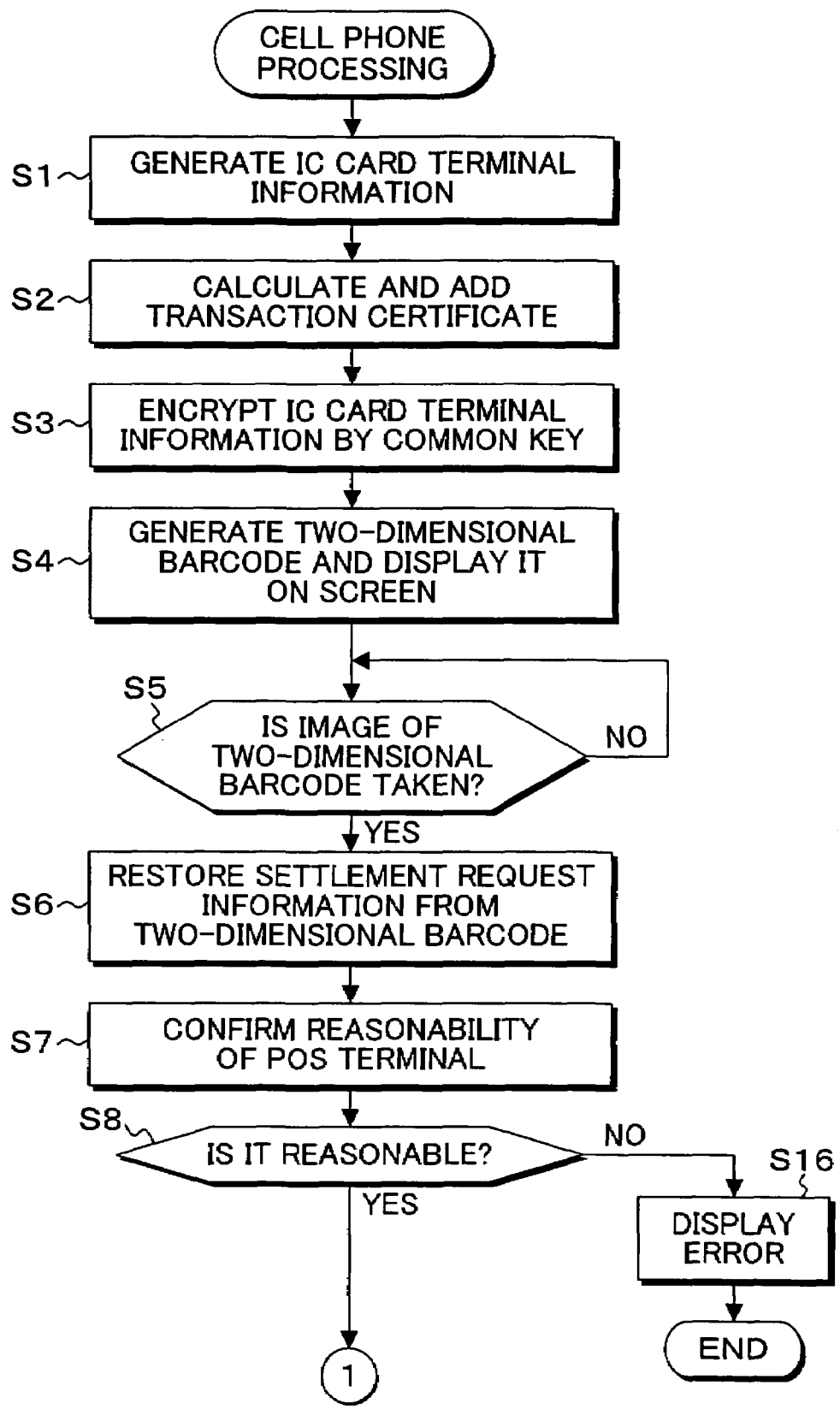
FIGS. 14A and 14B are flowcharts of cell phone processing corresponding to FIGS. 11A to 11C.
Figure 14B:
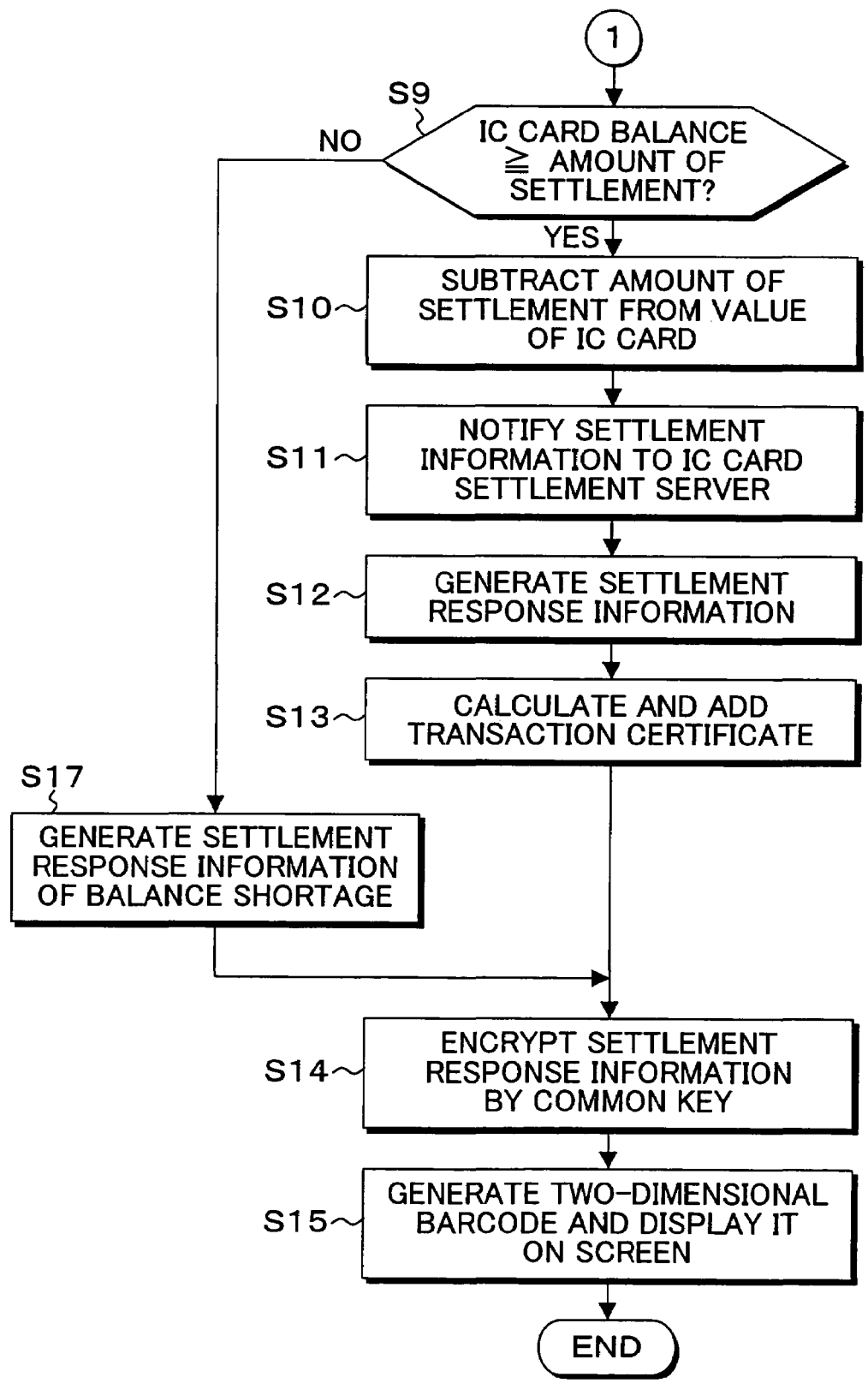

FIGS. 14A and 14B are flowcharts of the cell phone processing corresponding to FIGS. 11A to 11C. In FIGS. 14A and 14B, the cell phone processing comprises the steps of generating IC card terminal information in step S1, calculating and adding a transaction certificate in step S2, encrypting the IC card terminal information by means of the common key in step S3, and generating a two-dimensional barcode for display on the screen in step S4. This makes it possible to confirm reasonability of the cell phone 20 at the POS register terminal 10. The processes from step S5 to S17 are the same as those from step S1 to S13 shown in FIGS. 10A and 10B.

Figure 15A:
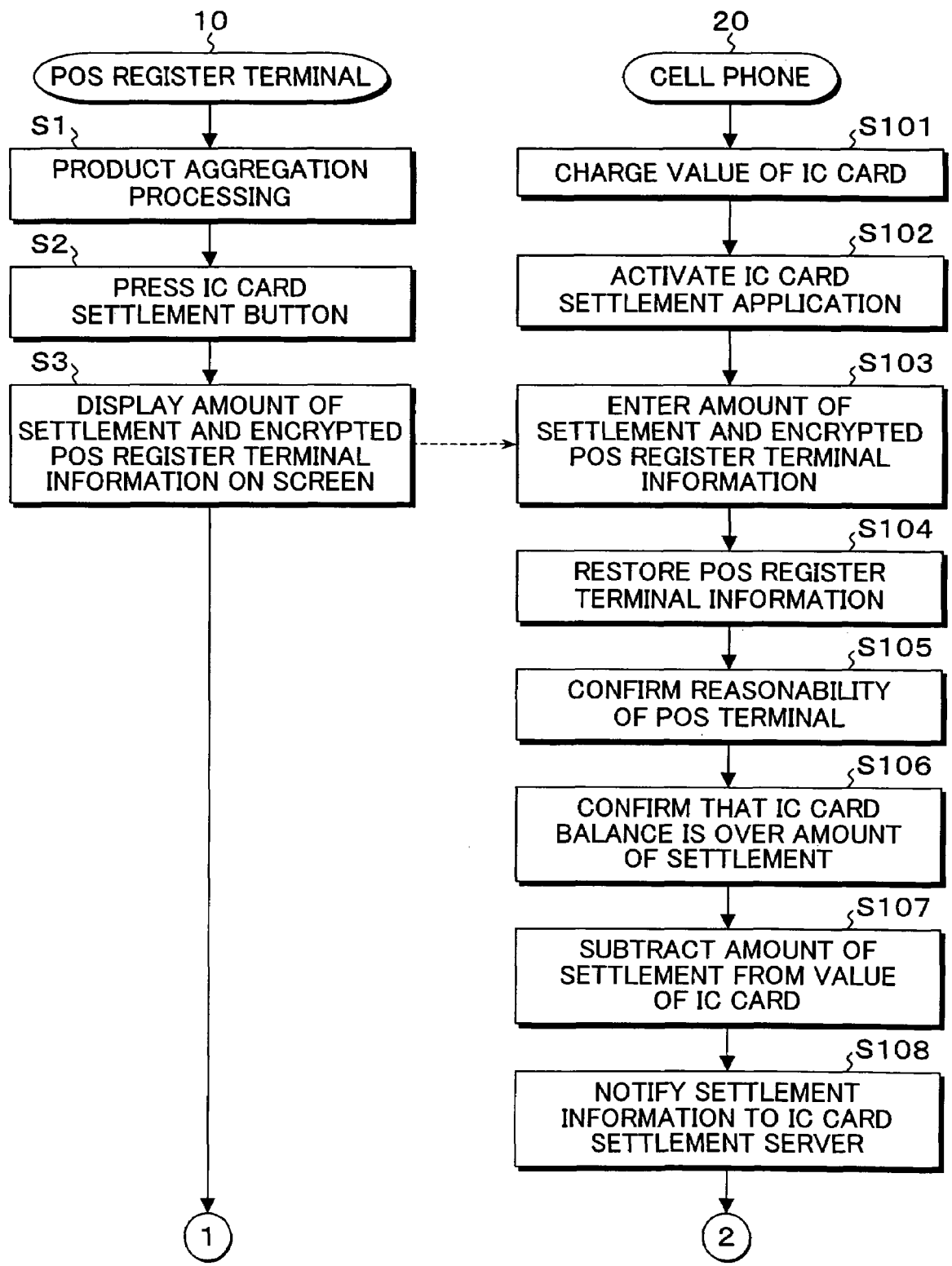
FIGS. 15A and 15B are time charts of an embodiment of a simplified settlement processing of the present invention, in which an amount of settlement is entered into the cell phone for processing.
Figure 15B:
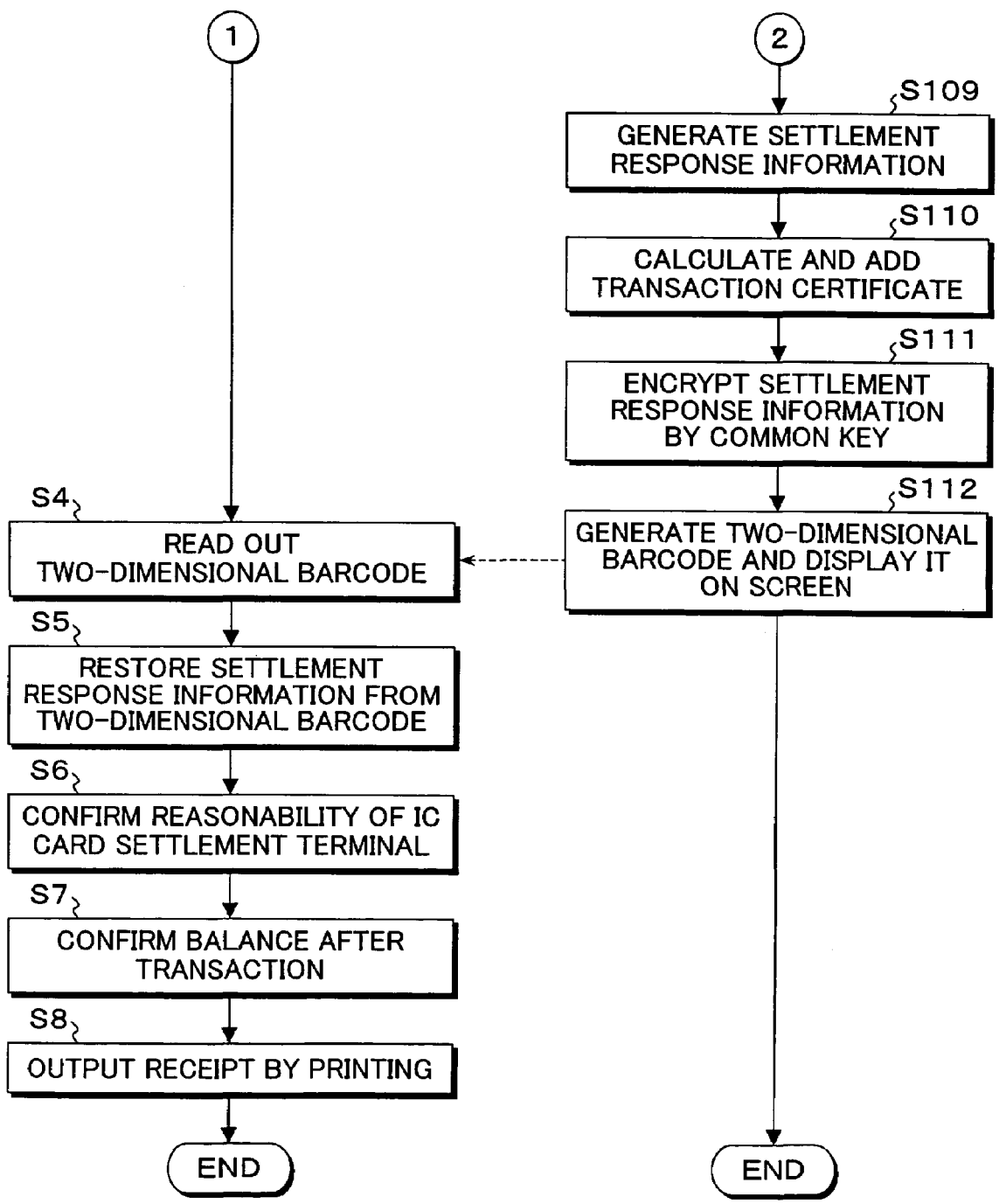

FIGS. 15A and 15B are time charts of an embodiment representing a simplified settlement processing of the present invention, in which the processing is carried out by entering an amount of settlement in the cell phone.

In FIGS. 15A and 15B, for the POS register terminal 10, when the IC card settlement button is pressed down in step S2 after the completion of the product aggregation processing in step S1, the amount of settlement and the encrypted POS register terminal information are displayed on the screen in step S3.

In the cell phone 20, on the other hand, a value in a prescribed amount has been charged in advance by use of a bank terminal or the like to the IC chip 24 in step S101. While the operator conducts processing at the POS register terminal 10, the IC card settlement application 68 is activated in step S102.

When the amount of settlement and the encrypted POS register terminal information are displayed on the screen in step S3 of the POS register terminal 10, the user who watches this enters the amount of settlement and the encrypted POS register terminal information into the cell phone 20 in step S103. In step S104, the POS register terminal information is restored, and reasonability of the POS register terminal 10 is confirmed from the transaction certificate added to the encrypted POS register terminal information in step S105.

Then, after confirming that the value balance of the IC chip 24 is over the amount of settlement in step S106, the amount of settlement is subtracted from the value of the IC chip 24 in step S107. The result of settlement processing is notified to the IC card settlement server 34 in step S108. Subsequently, in step S109, settlement response information including the balance after settlement is generated, and after calculating and adding a transaction certificate in step S110, the settlement response information is encrypted by use of the common key in step S111. Then in step S112, a two-dimensional barcode is generated from the encrypted settlement response information, and displayed on the screen.

For the POS register terminal 10, on the other hand, the two-dimensional barcode displayed on the screen of the cell phone 20 is read out in step S4. The settlement response information is restored from the two-dimensional barcode in step S5, and reasonability of the IC card settlement terminal, i.e., the cell phone 20 is confirmed from the transaction certificate added to the restored settlement information in step S6. The value balance of the IC chip 24 settlement transaction is checked up in step S7, and finally, the receipt is printed for output in step S8.

In this embodiment shown in FIGS. 15A and 15B, the POS register terminal processing can be simplified for the user holding the cell phone 20 by manually entering the settlement request information based on the IC chip from the POS register terminal 10 without the need to use a two-dimensional barcode.

Figure 16A:
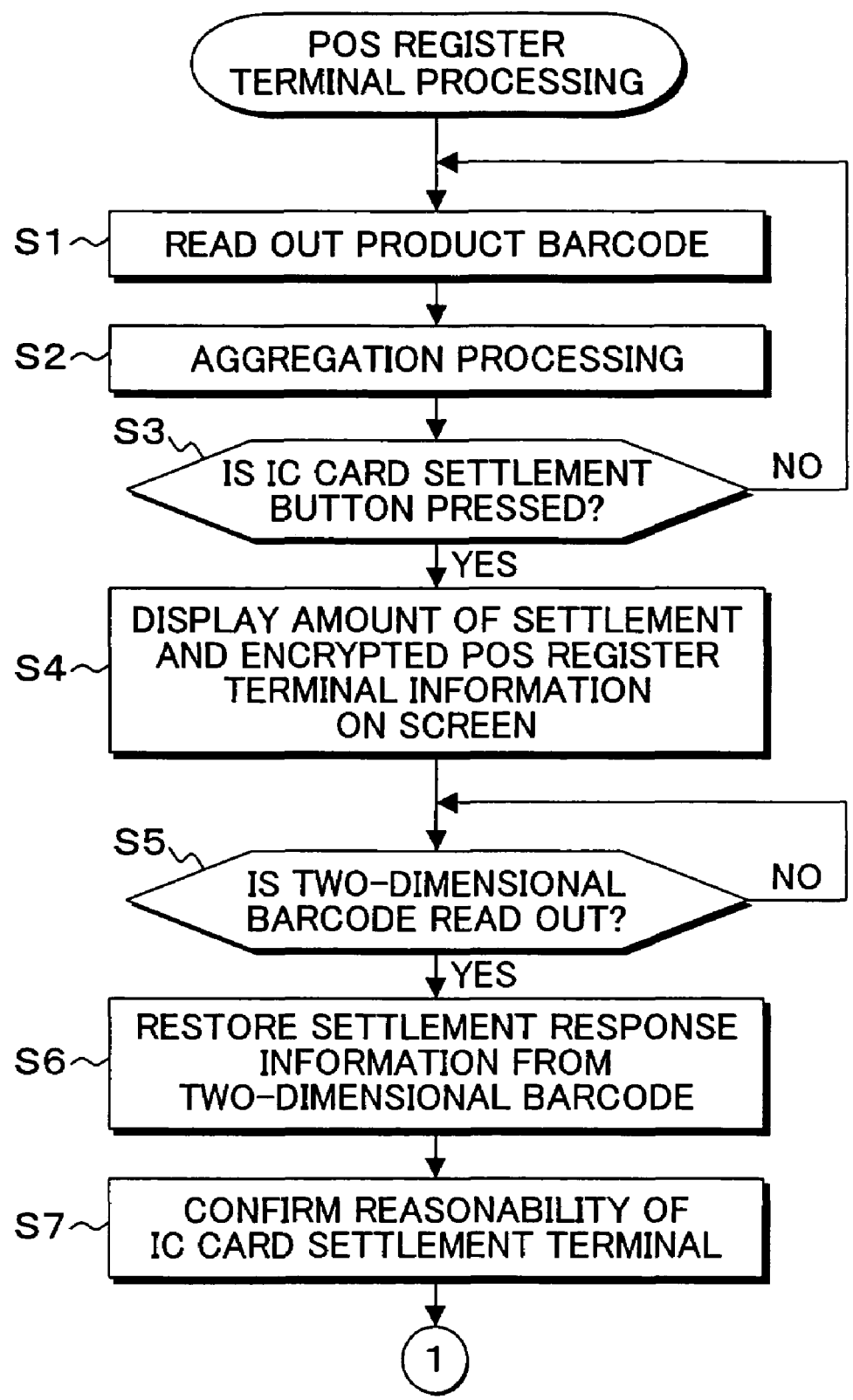
FIGS. 16A and 16B are flowcharts of POS register terminal processing corresponding to FIGS. 15A and 15B.
Figure 16B:
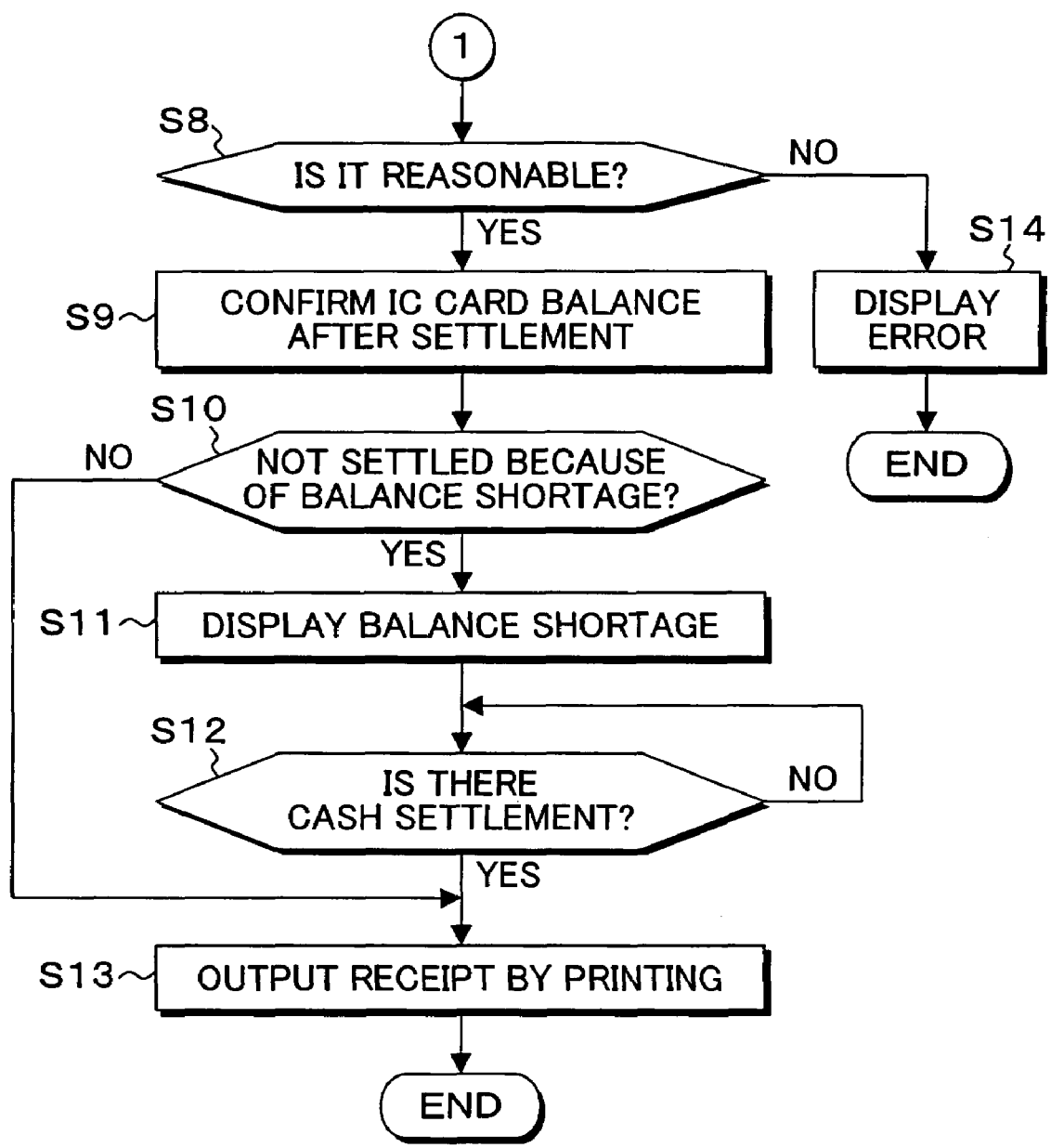

FIGS. 16A and 16B are flowcharts of the POS register terminal processing corresponding to FIGS. 15A and 15B. In FIGS. 16A and 16B, the POS register terminal processing comprises the steps of reading out the barcode of the product in step S1, and after an aggregation processing in step S2, pressing of the IC card settlement button is waited for in step S3.

Upon the completion of read of the barcodes of all the products, pressing of the IC card settlement button is determined in step S3, and the amount of settlement and the encrypted POS register terminal information are displayed on the screen in step S4. The processes from step S5 to step S14 shown in FIGS. 16A and 16B are the same as those from step S8 to step S17 shown in FIGS. 9A and 9B.

Figure 17B:
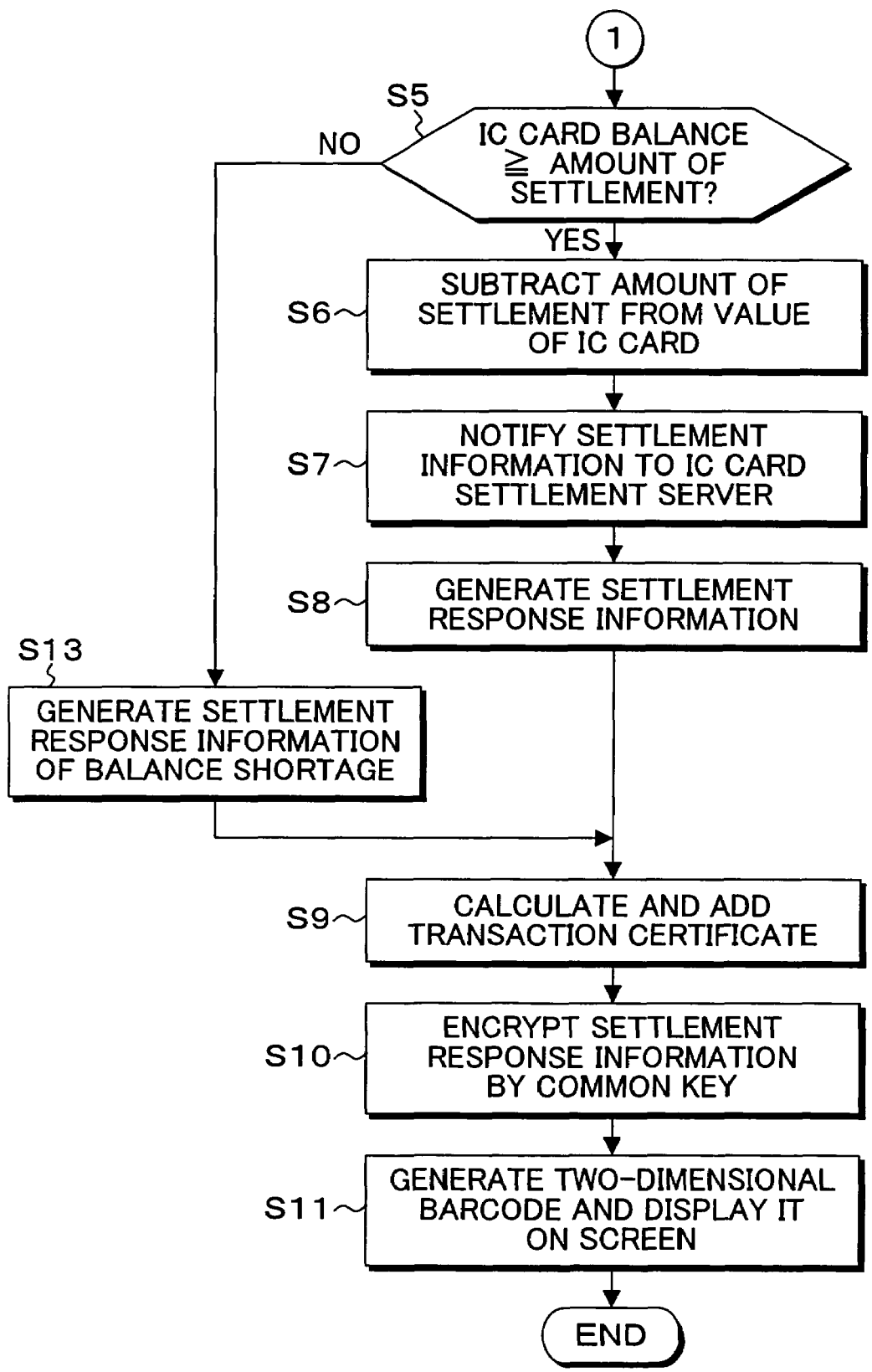

FIGS. 17A and 17B are flowcharts of the cell phone processing corresponding to FIGS. 15A and 15B. In FIGS. 17A and 17B, the cell phone processing comprises the step of entering the amount of settlement and the encrypted POS register terminal information displayed on the screen of the POS register terminal 10 by the user who presses down the operating button in step S1. POS register terminal information is restored in step S2. In step S3, reasonability of the POS register terminal 10 is confirmed from the transaction certificate added to the restored POS register terminal information. The processes from step S4 to step S13 are the same as those from step S4 to step S13 shown in FIGS. 10A and 10B.

Figure 18:
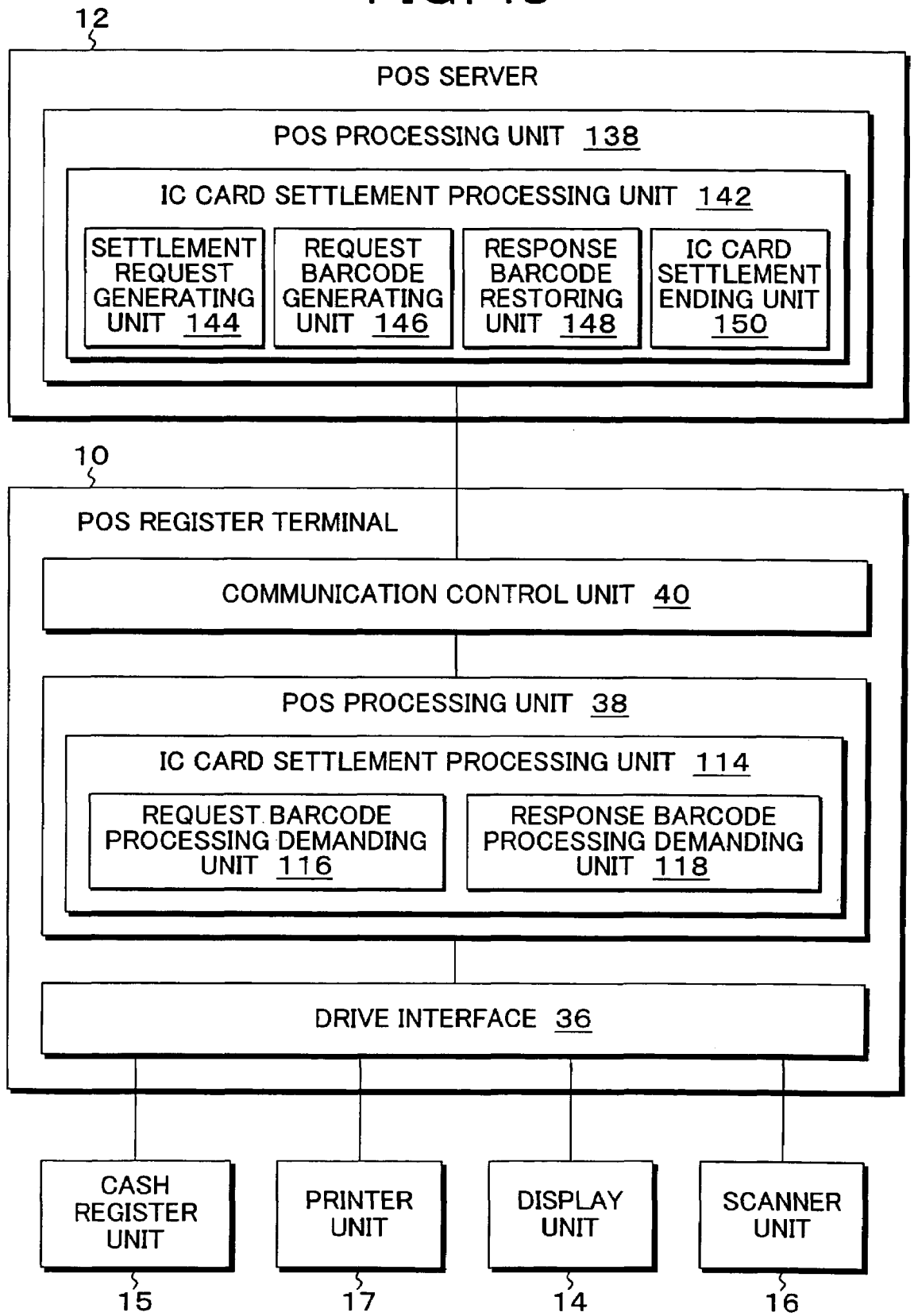
FIG. 18 is a block diagram of another embodiment on the POS system side of the present invention in which the settlement processing function is provided in the POS server.

FIG. 18 is a block diagram of another functional configuration of the present invention in which a settlement processing function is provided in the POS server. In FIG. 18, the POS register terminal 10 has a drive interface 36, a POS processing unit 38 and a communication control unit 40. A display unit 14, a cash register unit 15, a scanner unit 16 and a printer unit 17 are connected to the drive interface 36. The communication control unit 40 is connected to the POS server 12 and conducts communication control.

An IC card settlement processing unit 114 is provided in the POS processing unit 38, which is composed of functions of a request barcode processing demanding unit 116 and a response barcode processing demanding unit 118. In this configuration, the function of IC card settlement middleware 18 is provided in the form of an IC card settlement processing unit 142 in the POS processing unit 138 of the POS server 12. This IC card settlement processing unit 142 comprises functions including a settlement request generating unit 144, a request barcode generating unit 146, a response barcode restoring unit 148 and an IC card settlement ending unit 150.

These processing functions including the settlement request generating unit 144, the request barcode generating unit 146, the response barcode restoring unit 148 and the IC card settlement ending unit 150 are basically the same as the processing functions including the settlement request generating unit 44, the request barcode generating unit 46, the response barcode restoring unit 48 and the IC card settlement ending unit 50 provided in the IC card settlement processing unit 42 of the POS register terminal 10 in the block diagram shown in FIG. 2.

A difference from the processing functions shown in FIG. 2 lies in that, upon operator's pressing the IC card settlement button, the request barcode processing demanding unit 116 of the POS register terminal 10 demands the IC card settlement processing unit 142 to perform processing of the settlement request information, the transaction certificate, and the two-dimensional barcode generation, and also in that, upon reading out the two-dimensional barcodes displayed on the screen of the cell phone 20 by the scanner unit 16, the response barcode processing demanding unit 118 of the POS register terminal 10 demands the IC card settlement processing unit 142 of the POS server 12 to confirm reasonability of the cell phone 20 on the basis of the restoration of the two-dimensional barcode and the transaction certificate.

The load of processing acting on the POS register terminal 10 side can be alleviated by installing middleware serving as processing functions necessary for IC card settlement of the present invention on the POS server 12 side as described above.

In the above-mentioned embodiments, two-dimensional barcode has been presented as a typical barcode used for exchange of information necessary between the POS register terminal 10 and the cell phone 20. However, a scanner unit not capable of reading out two-dimensional barcodes may be provided, depending upon the type of the POS register terminal. In this case, multi-stage-configuration one-dimensional barcodes composed of one-dimensional barcodes arranged in a plurality of stages are used as barcodes.

The POS register terminal 10 in the above-mentioned embodiments has basically a CPU, an RAM and a hard disk drive as in a personal computer, thus providing a hardware environment of a computer which executes necessary processing by configuring middleware necessary for the IC card settlement processing of the present invention stored in the hard disk drive into RAM.

Also in the POS server 12, the hardware environment as a computer having a CPU, an RAM, a hard disk drive and a communication interface is applicable with no modification.

The present invention provides a program for IC card settlement processing with the POS register terminal 10 or the POS server 12. This program is achieved as details of the flowcharts show in FIGS. 9A, 9B, 13A, 13B, 16A and 16B. The present invention provides also a program for POS settlement processing, provided in the cell phone 20. This program is realized as having details of the flowcharts shown in FIGS. 10A, 10B, 14A, 14B, 17A and 17B.

The present invention includes appropriate variations without impairing the object and advantages thereof, and is not limited by numerical values shown in the above-mentioned embodiments.

What is claimed is:

1. A shop settlement method using a cell phone, having a camera and an IC chip, and a POS register terminal, the method comprising:
    generating, at said POS register terminal, settlement request information including an amount of settlement upon receipt of an operational input of IC card settlement to said POS register terminal;
    generating a request barcode from said settlement request information and causing screen display or printing output by said POS register terminal;
    restoring said settlement request information by imaging said request barcode by the camera of said cell phone;
    subtracting an amount of settlement of the settlement request information restored from a value charged to the IC chip of said cell phone;
    generating settlement response information including a balance after settlement of said IC chip;
    causing screen display by said cell phone by generating a response barcode from said settlement response information;
    restoring said settlement response information by reading out said response barcode of said POS register terminal; and
    confirming the end of IC card settlement from the restored settlement response information, thereby printing a receipt by said POS register terminal.

2. The shop settlement method according to claim 1, wherein:
    said generating, at said POS register terminal, calculates and adds a first transaction certificate from said settlement request information;
    said generating the request barcode generates said request barcode after encrypting the settlement request information having said first transaction certificate added thereto;
    said restoring settlement request information restores said settlement request information from the encrypted settlement request information restored from said request barcode, and compares the first transaction certificate calculated from the restored settlement request information and said restored first transaction certificate to confirm reasonability of said POS register terminal;
    said generating settlement response information calculates and adds a second transaction certificate from said settlement response information;
    said causing screen display generates said response barcode after encrypting the settlement response information having said added second transaction certificate; and
    said restoring settlement response information restores said settlement response information from the encrypted settlement response information restored from said response barcode, and compares the second transaction certificate calculated from the restored settlement response information and said restored second transaction certificate, thereby confirming proper operation of said cell phone.

3. A shop settlement method using a cell phone, having a camera and an IC chip, and a POS register terminal, the method comprising:
    causing screen display of an amount of settlement and an encrypted POS register terminal information upon receipt of an operational input of IC card settlement at said POS register terminal;
    subtracting the amount of settlement from a value charged to the IC chip, after confirming proper operation of said POS register terminal by operationally entering said amount of settlement and encrypted POS register terminal information into said cell phone;
    generating settlement response information including a balance after settlement of said IC chip;
    causing screen display by said cell phone by generating a response barcode from said settlement response information;
    restoring said settlement response information by reading out said response barcode by said POS register terminal; and
    printing a receipt by said POS register terminal by confirming an IC card settlement from the restored settlement response information.

4. The shop settlement method according to claim 3, wherein:
    said causing screen display calculates and adds a first transaction certificate from information intrinsic to said POS register terminal, and causes encryption and screen display of the POS register terminal information having said added first transaction certificate;
    said subtracting restores said POS register terminal information, and subtracts an amount of settlement from a value charged to the IC chip after confirming proper operation of said POS register terminal by comparing the first transaction certificate calculated from the restored POS register terminal information and said restored first transaction certificate;
    said generating settlement response information calculates and adds a second transaction certificate from said settlement response information;
    said generating the response barcode generates said response barcode after encrypting the settlement response information having said added second transaction certificate; and
    said restoring settlement response information restores said settlement response information from the encrypted response information restored from said response barcode, and confirms proper operation of said cell phone by comparing the second transaction certificate calculated from the restored settlement response information and said restored second transaction certificate.

5. A shop settlement system using a cell phone, having a camera and an IC chip, and a POS register terminal, the system comprising:
    said POS register terminal having:
        a settlement request generating unit which generates settlement request information including an amount of settlement upon receipt of an operational input of IC card settlement; and
        a request barcode generating unit which causes screen display or printing output of a request barcode generated from said settlement request information;
    said cell phone having:
        a request barcode restoring unit which restores said settlement request information by imaging said request barcode by said camera;
        an IC card settlement unit which subtracts an amount of settlement of the settlement request information restored from a value charged to said IC chip;
        a settlement response generating unit which generates settlement response information including a balance after settlement of said IC chip; and
        a response barcode generating unit which generates a response barcode from said settlement response information and causes screen display thereof; and
    said POS register terminal having:
        a response barcode restoring unit which restores said settlement response information by reading out said response barcode; and
        an IC card settlement ending unit which prints a receipt by confirming the end of the IC card settlement from the restored settlement response information.

6. The shop settlement system according to claim 5, wherein:
    said settlement request generating unit calculates and adds a first transaction certificate from said settlement request information;
    said request barcode generating unit generates said request barcode after encrypting the settlement request information having said first transaction certificate added thereto;
    said request barcode restoring unit restores said settlement request information from the encrypted settlement request information restored from said request barcode, and confirms proper operation of said POS register terminal by comparing the first transaction certificate calculated from the restored settlement request information and said first transaction certificate;
    said settlement response generating unit calculates and adds a second transaction certificate from said settlement response information;
    said response barcode generating unit generates said response barcode after encrypting the settlement response information having said second transaction certificate added thereto; and
    said response barcode restoring unit restores said settlement response information from the encrypted settlement response information restored from said response barcode, and confirms proper operation of said cell phone by comparing the second transaction certificate calculated from the restored settlement response information and said restored second transaction certificate.

7. A shop settlement system using a cell phone, having a camera and an IC chip, and a POS register terminal, the system comprising:
    said POS register terminal having:
        a settlement request generating unit which causes screen display of an amount of settlement and an encrypted POS register terminal information upon receipt of an operational input of IC card settlement;
    said cell phone, having:
        an IC card settlement unit which operationally enters said amount of settlement and encrypted POS register terminal information, and after confirming proper operation of said POS register terminal, subtracts the amount of settlement from a value charged to the IC chip;
        a settlement response generating unit which generates settlement response information including a balance after settlement of said IC chip;
        and a response barcode generating unit which causes screen display by generating a response barcode from said settlement response information; and
    said POS register terminal, having:
        a response barcode restoring unit which restores response barcode; and
        an IC card settlement ending unit which prints a receipt by confirming the end of the IC card settlement from the restored settlement response information.

8. The shop settlement system according to claim 7, wherein:
    said settlement request generating unit calculates and adds a first transaction certificate from information intrinsic to said POS register terminal, and encrypts the POS register terminal information having said first transaction certificate added thereto for screen display;
    said IC card settlement unit restores said POS register terminal information, and after confirming proper operation of said POS register terminal by comparing the first transaction certificate calculated from the restored POS register terminal information and said restored first transaction certificate, subtracts an amount of settlement from a value charged to the IC chip;
    said settlement response generating unit calculates and adds a second transaction certificate from said settlement response information;
    said response barcode generating unit generates said response barcode after encrypting the settlement response information having said second transaction certificate added thereto; and
    said response barcode restoring unit restores said settlement response information from the encrypted settlement response information restored from said response barcode, and confirms proper operation of said cell phone by comparing the second transaction certificate calculated from the restored settlement response information and said restored second transaction certificate.

9. A computer readable storage medium storing a program which causes a computer serving as a POS register terminal or a POS server to execute:
    generating settlement request information including an amount of settlement upon receipt of an operational input of IC card settlement;
    generating a request barcode from said settlement request information, and causing said POS register terminal to display the same on a screen or print the same as output;
    reading out a response barcode screen-displayed on a cell phone and restoring said settlement response information; and confirming the end of IC card settlement from the restored settlement response information and printing a receipt from said POS register terminal.

10. The computer-readable storage medium according to claim 9, wherein:

said generating settlement request information calculates and adds a first transaction certificate from said settlement request information;

said generating request barcode generates said request barcode after encrypting the settlement request information having said first transaction certificate added thereto; and said reading out restores said settlement response information from the encrypted settlement response information restored from said response barcode, and confirms proper operation of said cell phone by comparing a second transaction certificate calculated from the restored settlement response information and said restored second transaction certificate.

11. A computer-readable storage medium storing a program causing a computer of a cell phone having a camera and an IC chip to execute:

restoring settlement request information by imaging a request barcode screen-displayed or printing-outputted at a POS register terminal by said camera;

subtracting an amount of settlement of the restored settlement request information from a value charged to said IC chip;

generating a settlement response information including a balance after settlement of said IC chip; and generating a response barcode from said settlement response information for screen display.

12. The computer-readable storage medium according to claim 11, wherein:

said restoring restores said settlement request information from an encrypted settlement request information restored from said request barcode, and confirms proper operation of said POS register terminal by comparing a first transaction certificate calculated from the restored settlement request information and said restored first transaction certificate;

said generating calculates and adds a second transaction certificate from said settlement response information; and said generating the response barcode generates said response barcode after encrypting the settlement response information having said second transaction certificate added thereto.

13. A computer-readable storage medium storing a program causing a computer serving as a POS register terminal or a POS server to execute:

causing screen display of an amount of settlement and encrypted POS register terminal information upon receipt of an operational input of IC card settlement;

restoring a settlement response information by reading out a response barcode screen-displayed on a cell phone; and printing-outputting a receipt by said POS register terminal by confirming the end of IC card settlement from a restored settlement response information.

14. The computer-readable storage medium according to claim 13, wherein:

said causing screen display calculates and adds a first transaction certificate from information intrinsic to said POS register terminal and encrypts the POS register terminal information having said first transaction certificate added thereto for screen display; and said restoring restores said settlement response information from encrypted settlement response information restored from said response barcode, and confirms proper operation of said cell phone by comparing the second transaction certificate calculated from the restored settlement response information and said restored second transaction certificate.

15. A computer-readable storage medium storing a program causing a computer of a cell phone having a camera and an IC chip to execute:

subtracting an amount of settlement from a value charged to an IC chip, after confirming proper operation of a POS register terminal from the operationally entered settlement amount and an encrypted POS register terminal information;

generating a settlement response information including a balance after settlement of said IC chip; and generating a response barcode from said settlement response information and causing screen display thereof.

16. A computer-readable storage medium according to claim 15, wherein:

said subtracting restores said POS register terminal information, and after confirming proper operation of said POS register terminal by comparing a first transaction certificate calculated from the restored POS register terminal information and said restored first transaction certificate, subtracts an amount of settlement from a value charged to the IC chip;

said generating settlement response calculates and adds a second transaction certificate from said settlement response information; and said generating response barcode generates said response barcode after encrypting the settlement response information having said second transaction certificate added thereto.

* * * * *